US010368034B2

(12) United States Patent
Zuo et al.

(10) Patent No.: US 10,368,034 B2
(45) Date of Patent: Jul. 30, 2019

(54) METHODS AND SYSTEMS FOR CONNECTING CALLER AND CALLEE CLIENT DEVICES

(71) Applicant: Facebook, Inc., Menlo Park, CA (US)

(72) Inventors: Zhengping Zuo, Medina, WA (US); Stephane Taine, Issaquah, WA (US); Brendan Benjamin Aronoff, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/362,793

(22) Filed: Nov. 28, 2016

(65) Prior Publication Data
US 2018/0152665 A1  May 31, 2018

(51) Int. Cl.
H04N 7/14 (2006.01)
H04L 29/06 (2006.01)
H04L 12/58 (2006.01)

(52) U.S. Cl.
CPC ............ H04N 7/147 (2013.01); H04L 51/32 (2013.01); H04L 65/1069 (2013.01); H04L 65/1093 (2013.01); H04L 65/1096 (2013.01); H04L 65/403 (2013.01)

(58) Field of Classification Search
USPC .................................................... 348/14.01
See application file for complete search history.

(56) References Cited

U.S. PATENT DOCUMENTS

| 5,742,674 A * | 4/1998 | Jain ........................ H04M 3/48 379/111 |
| 2004/0119814 A1 | 6/2004 | Clisham et al. |
| 2007/0160076 A1* | 7/2007 | Faber .................... H04L 63/083 370/461 |
| 2007/0291931 A1 | 12/2007 | DeMent |
| 2009/0022296 A1 | 1/2009 | Hughes et al. |
| 2010/0208877 A1 | 8/2010 | Meriaz et al. |
| 2011/0158231 A1 | 6/2011 | Kudo |
| 2015/0106438 A1 | 4/2015 | Fan et al. |
| 2016/0087913 A1 | 3/2016 | Wang et al. |
| 2016/0183307 A1 | 6/2016 | Xu et al. |
| 2016/0381214 A1 | 12/2016 | Messenger et al. |
| 2017/0374194 A1* | 12/2017 | Sales ................... H04L 61/1594 |

OTHER PUBLICATIONS

Office Action received for U.S. Appl. No. 15/362,787, dated Jun. 29, 2017, 9 pages.

* cited by examiner

Primary Examiner — Amal S Zenati

(57) ABSTRACT

Exemplary embodiments relate to techniques for facilitating a connection between two users in a call by providing an "answering window" when a user calls. When a caller places a call to a callee, the call invitation may remain open for a window of time during which the caller remains available. The callee may opt to answer the call at any time during the window. During the window, the caller may be placed in a lobby and may share audio and/or video. Accepting the call during the answering window may place the callee in the lobby or may directly convert the interaction into an active call. The callee may request that the window can be altered, or may signal their intention to answer the call at a particular time.

18 Claims, 30 Drawing Sheets

Caller Client-Side
Status Logic
400

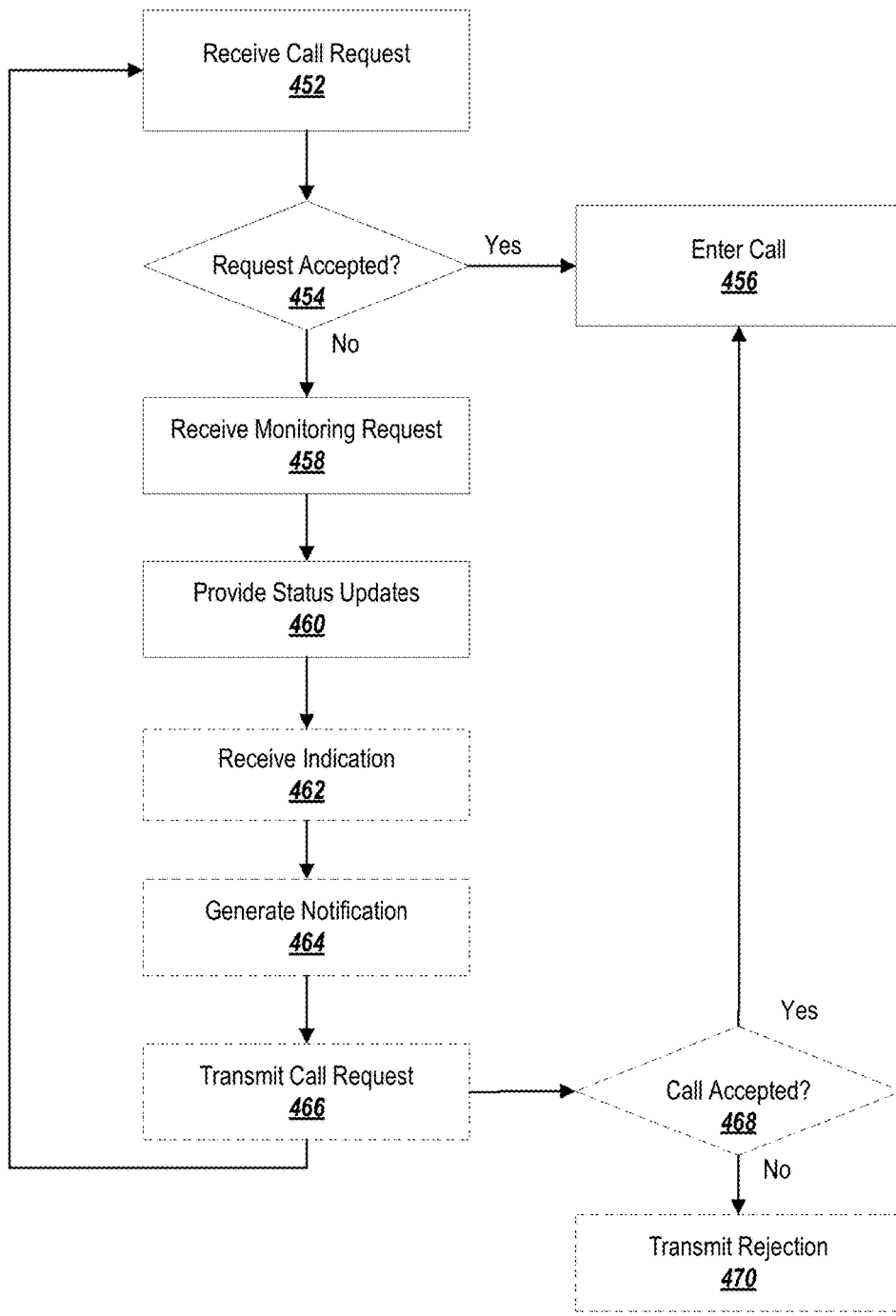

Caller Client-Side
Answer Window
Logic
600

Callee Client-Side Answer Window Logic
650

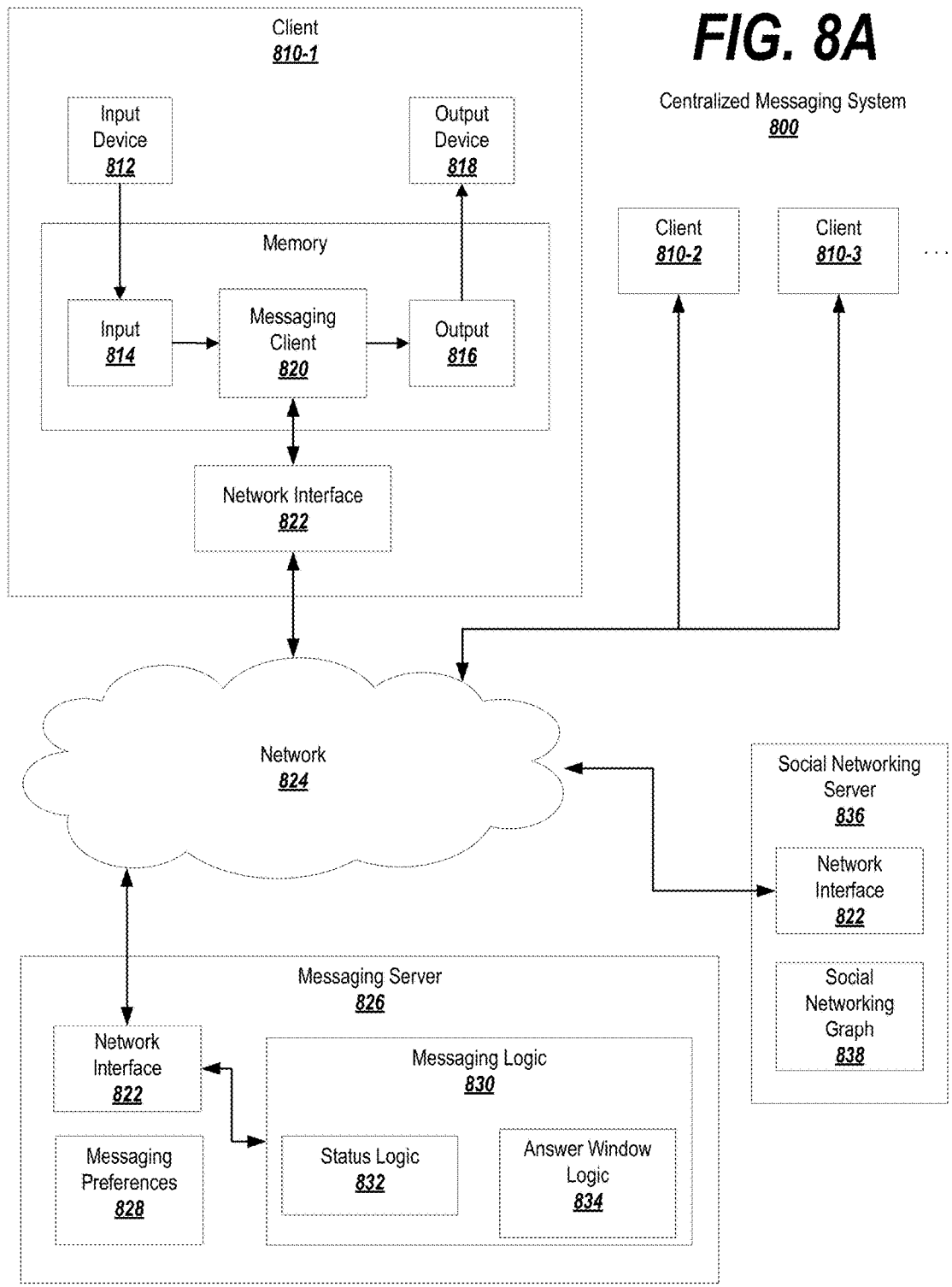

METHODS AND SYSTEMS FOR CONNECTING CALLER AND CALLEE CLIENT DEVICES

BACKGROUND

Communications systems allow two or more users to communicate by exchanging text, audio, video, or other forms of communications. Communications systems may allow users to communicate synchronously (e.g., a real-time conversation), but it may be difficult for users to set up synchronous conversations. For example, a synchronous conversation generally requires that all conversation participants are interacting with their communications devices at the same time, and scheduling this availability may be difficult. In some cases, a caller may hang up after a relatively short period of time after receiving no response.

BRIEF DESCRIPTION OF THE DRAWINGS

FIG. 4B is a flowchart depicting exemplary callee client-side status logic;

FIG. 8A is a block diagram providing an overview of a system including an exemplary centralized communications service;

DETAILED DESCRIPTION

Figure 1A:
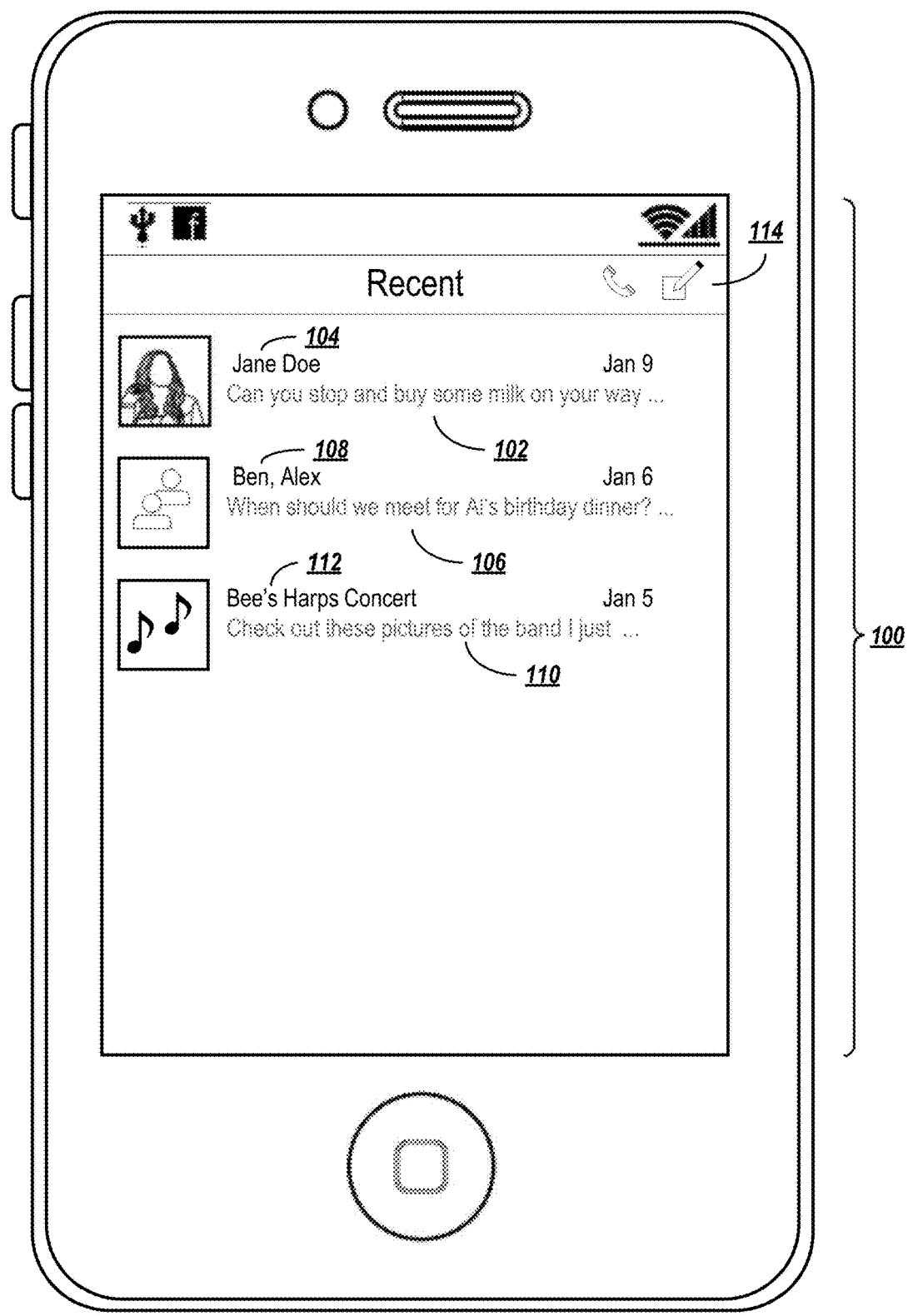
FIG. 1A depicts an exemplary communications interface including several types of individual and group messages.

Exemplary embodiments relate to techniques for connecting two or more users in a synchronous video communication. According to some embodiments, when a caller places a call but a callee does not answer in a predetermined period of time (e.g., 10 seconds), the calling application hangs up the call. The calling application requests that the status of the called party be monitored to determine when the callee becomes available. Various conditions may be used to determine when the callee becomes available, such as presence in a messaging or social networking app associated with the call, presence or activity in a third-party application unassociated with the call, or when the user's device is turned on or wakes up. When it is determined that the callee is available, a notification may be sent to the caller informing the caller that it is a good time to call back. The techniques may be used in reverse, informing the callee of when the caller is available for a return call. The party being monitored may be monitored for a predetermined period of time (e.g., 1 day) and monitoring may be suspended at certain times (e.g., during the night or when the user is scheduled to be in a meeting).

In further embodiments that may be combined with the above-described embodiments, an "answering window" may be provided when a user calls. When a caller places a call to a callee, the call remains open for a window of time during which the caller remains available. The window may be determined automatically (e.g., based on the caller's schedule as retrieved through a calendar application), manually, or both. The callee can opt to answer the call at any time during the window. During the window, the caller may be placed in a lobby and may share audio and/or video. Accepting the call during the answering window may place the callee in the lobby or may directly convert the interaction into an active call. The callee may request that the window can be altered (e.g., "give me five more minutes") or may signal their intention to answer the call at a particular time (e.g., "answer in five minutes").

Using these techniques, an extended period is provided for answering a call, during which there is an increased likelihood that two or more users may be able to connect. During the call answering window, the caller and callee(s) may engage in other tasks. By providing the callee with the opportunity to modify the calling window and/or indicate at which time a call will be returned, the caller is provided with additional information that may help to set expectations as to when the call will occur. Moreover, users who have been unable to connect in a synchronous call may be able to connect later at a better time by monitoring each others' statuses.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

A general overview of video communication techniques is now described.

Users may interact with a messaging system through a client application. FIG. 1A depicts an example of a client application displaying a messaging interface 100. The messaging interface 100 of FIG. 1A shows an exemplary summary screen that provides an overview of messages recently sent to (or by) the user of the client application.

Messaging systems may support a variety of different types of messages. For example, the messaging interface 100 includes a summary of a one-to-one (or individual) message 102. A one-to-one message is a message exchanged between two entities, so that only the two entities can see and participate in the conversation. For example, in the one-to-one message 102, the current user (Jack Doe) recently received a message from his wife, Jane Doe. The other participant in the conversation is indicated in the interface 100 using an identifier 104 (including a name and profile picture, in this example). Only Jack and Jane participate in the conversation, and only Jack and Jane can view the conversation.

Another message type supported by the messaging system is a group conversation. In a group conversation, multiple users see and participate in the conversation. FIG. 1A depicts an exemplary summary of a group conversation 106. In the summary of the group conversation 106, each of the other users participating in the conversation is indicated by respective identifiers 108. In this case, the identifiers include the names or handles of the other users participating in the group conversation, and an icon to indicate that the conversation is a group conversation. For example, in this case the current user (Jack) is participating in a conversation with his friends Ben and Alex. Jack, Ben, and Alex can each see all of the messages in the conversation (regardless of who sent the message) and can send messages to the group.

Another type of message supported by the messaging system is a message between one or more users and an organization (such as a business) or event. For example, FIG. 1A shows an event message 110 sent by the current user (Jack) to the page of an event being organized through a social network. The identifier 112 identifies the name of the event, and an icon is presented identifying this particular event is a concert. In an event message 110, all participants in the event (as a participant is defined, e.g., by the event's social networking page) can view and send event messages 110. Participants may include, for example, people attending the event, fans of the event that have signed up with the event's page to receive messages about the event, event organizers, etc.

By selecting an existing message summary 102, 106, 110, the user can view messages in an existing conversation and add new messages to the conversation. Moreover, the interface 100 includes interface elements 114 allowing the user to create a new message.

Figure 1B:
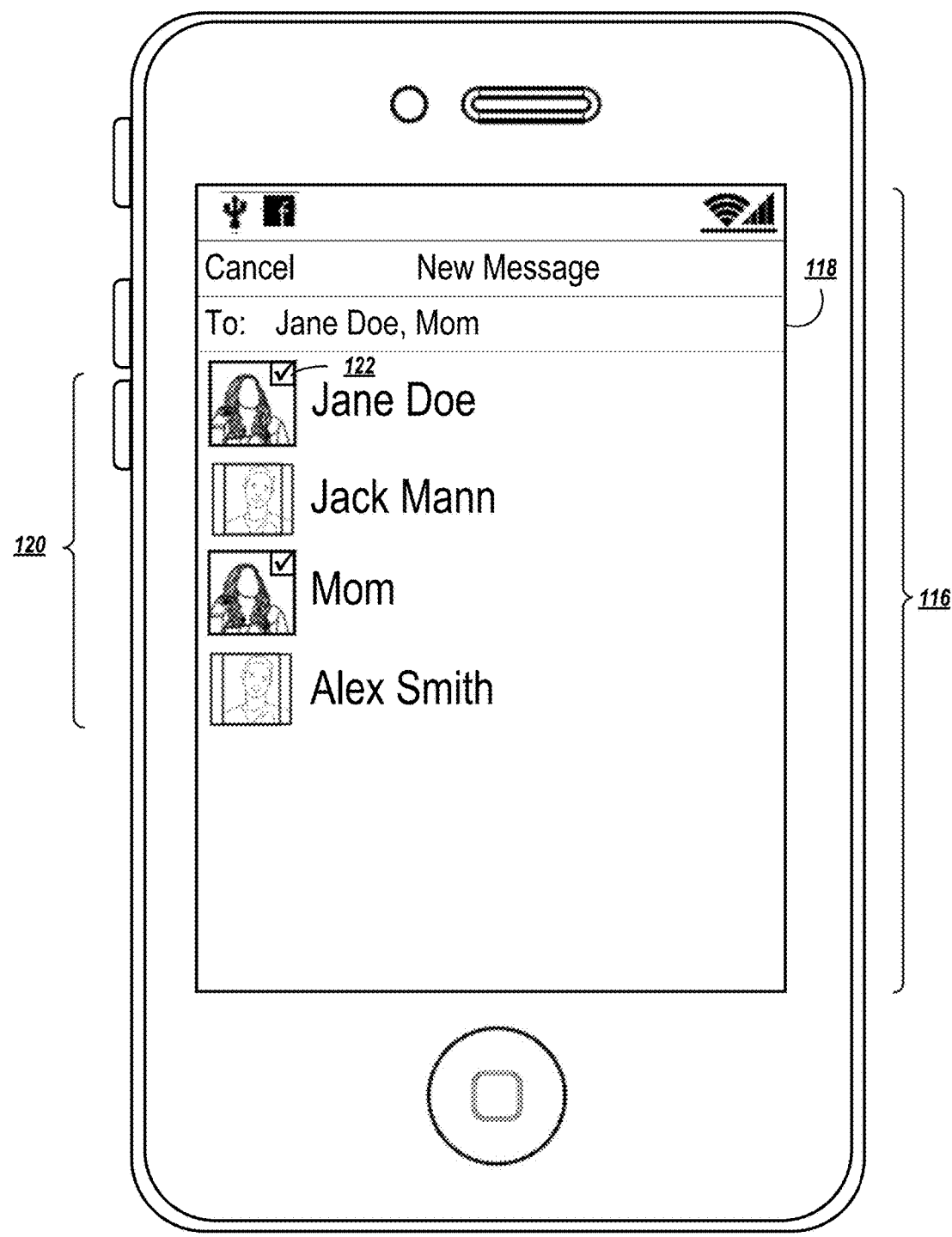
FIG. 1B depicts an example of selecting a group of recipients to engage in a communication in a messaging interface.

For example, FIG. 1B depicts an interface 116 displayed by the messaging client application in response to receiving a selection of the "compose" interface element 114. A "new message" window is displayed in the interface 116. The new message window includes a recipient field 118 for allowing the user to manually enter identifiers for one or more recipients. If available, the user's contacts list 120 may also be displayed in the interface 116 in order to simplify the selection of the recipients.

In the example of FIG. 1B, the user has entered the identifier of a recipient in the recipient field 118. In order to indicate the recipient's inclusion in the recipients list, a selection indication 122 is displayed on the recipient's icon in the contacts list 120. As shown in this example, it is possible to select more than recipient in the interface 116 in order to create a group message, e.g. by manually adding multiple recipients in the recipient field 118, selecting multiple contacts in the contacts list 120, or a combination of methods.

Figure 1C:
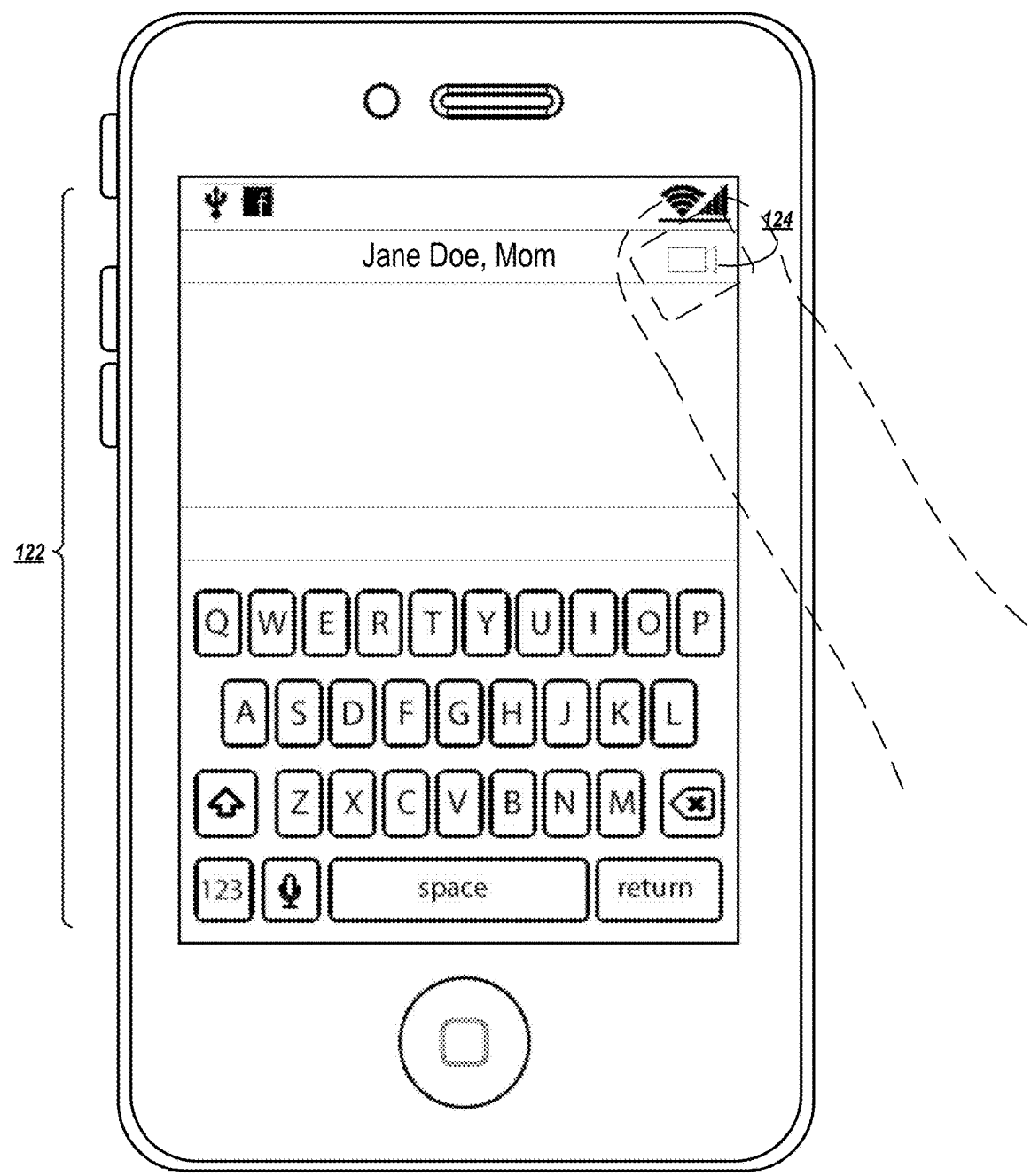
FIG. 1C depicts an exemplary interface for initiating a video communication.

As shown in FIG. 1C, a user may indicate an intent to engage in a live (synchronous) video conversation with the recipients. The user may select the intended recipients of the video recording or video conversation before or after indicating the intent. In order to indicate the intent, a content creation interface 122 may be presented, which may include various ways to generate a message (e.g., a keyboard for entering text, an icon for recording audio, etc.). The content creation interface 122 may include an icon 124 or other designator that, upon selection, signals the user's intent to transmit video content.

Other methods for initiating a video call may also be used.

Upon receiving a selection of the icon 124, the client may display a lobby interface 126 (FIG. 1D) while attempting to connect to the recipients in a live video conversation. The lobby may represent a meeting space that users can enter or leave without necessarily sharing audio or video. An option may be presented to allow the caller (or, in some embodiments, any user) to connect the users in the lobby in a synchronous video communication, as described in more detail in connection with FIG. 3B.

The lobby interface 126 may include status indications 128 indicating which, if any, recipients have joined the call. In the example depicted in FIG. 1D, no users have yet joined the call and hence the status indications 128 are greyed-out. The lobby interface 126 may further include a preview window 130 that shows a preview of the video that the user would be sending to any connected recipients. Optionally, the content of the preview window 130 may be streamed to the users that have not yet connected. The content may include audio and video content. Alternatively, audio or video content may be sent in isolation.

Figure 1D:
FIG. 1D depicts an exemplary interface for providing a lobby while a caller awaits responses from callees.
Figure 1E:
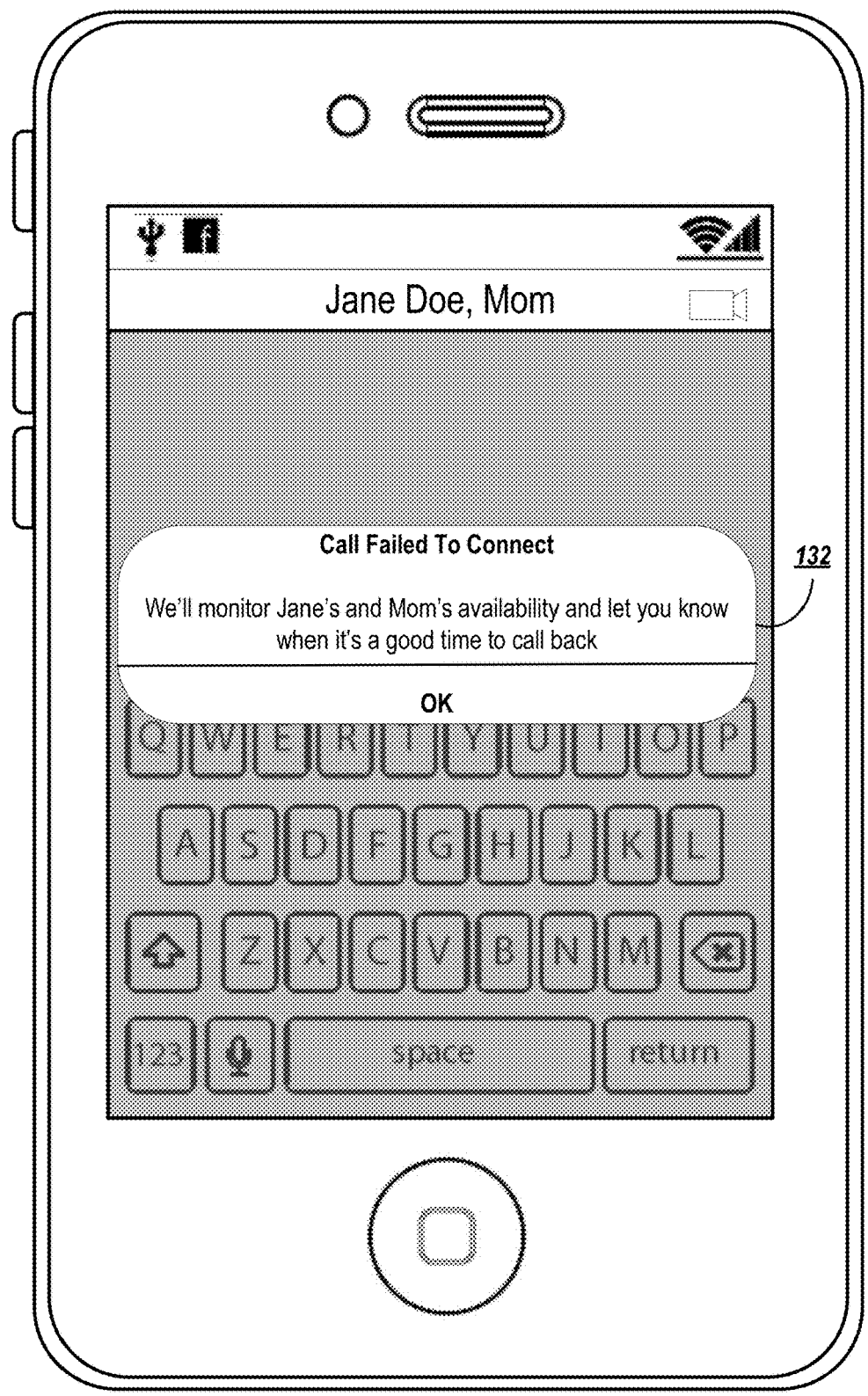
FIG. 1E depicts an exemplary interface informing a caller that their call failed to connect.

FIG. 1E depicts an exemplary interface displaying a notification 132 that may be sent when a call fails to connect. A call may fail to connect if the invitation to join the call is expressly rejected (e.g., the callee instructs the callee's client device to ignore or reject the call), or if the call is implicitly rejected (e.g., the callee's client device is turned off, or the callee fails to respond to the invitation within a predetermined time or before the caller hangs up). The notification 132 may include an indication that the callee's status will be monitored and that further notifications will be issued when the callee becomes available.

Figure 1F:
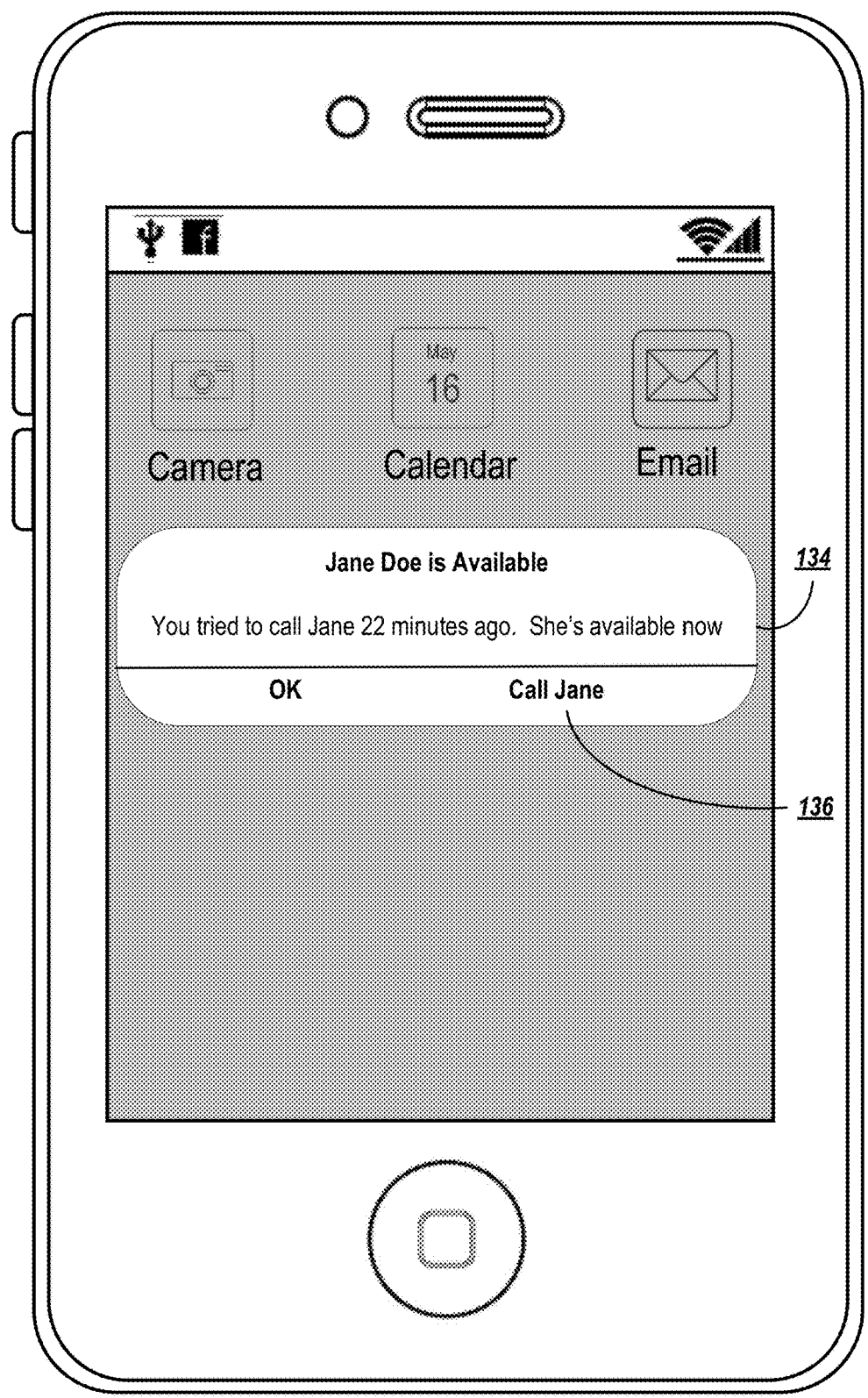
FIG. 1F depicts an exemplary interface for informing a caller about the availability of a callee.

FIG. 1F depicts such a notification 134 for when a callee becomes available. The notification 134 may be displayed on the caller's client device and may include a description of which callee has become available, and when the call was attempted. Additional information (e.g., the callee's status, such as "phone turned on" or "present in messaging application) may also be presented. A selectable option 136 may be associated with the notification 134 for issuing a new invitation to engage in synchronous video communication with the callee.

Figure 1G:
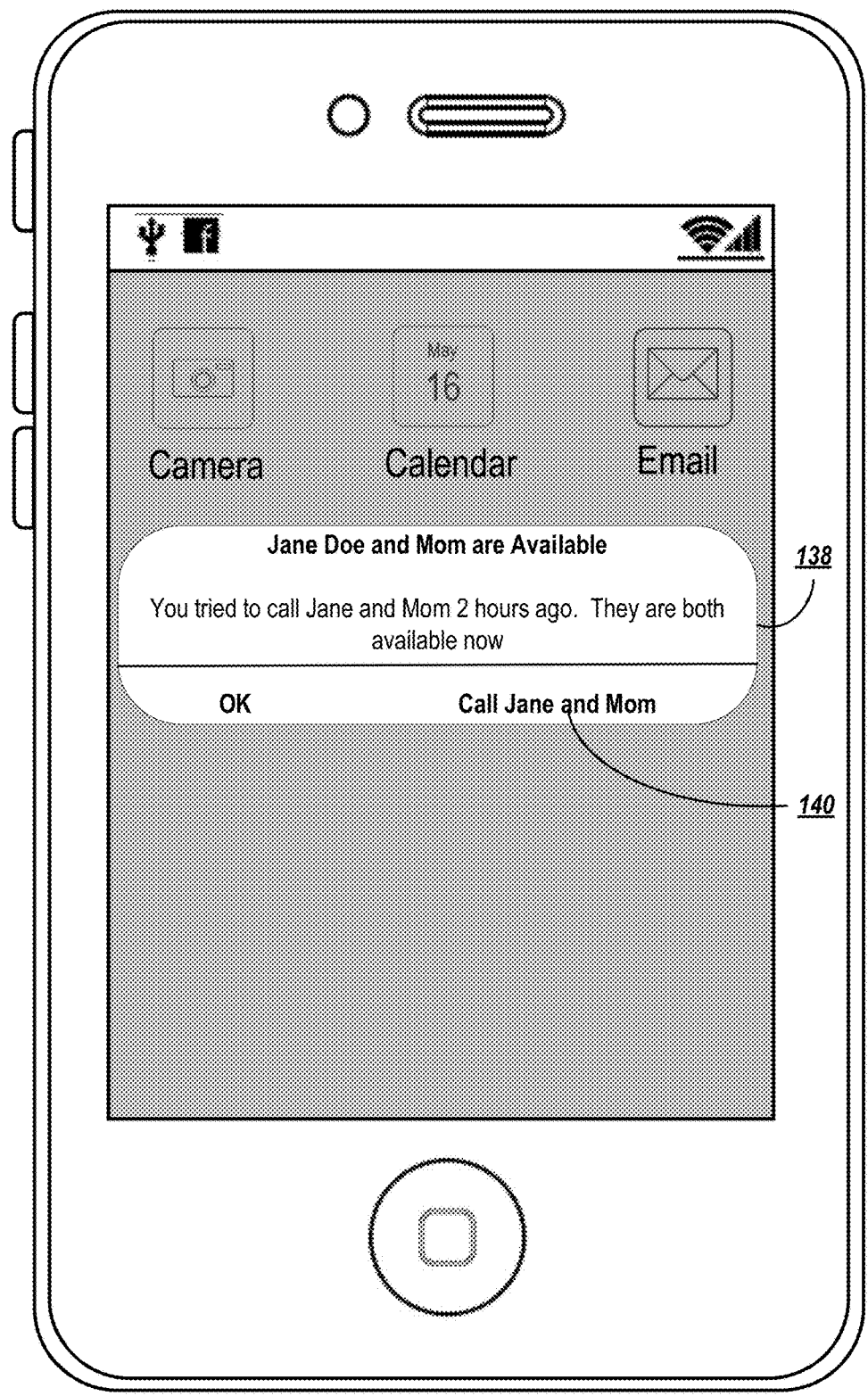
FIG. 1G depicts an exemplary interface for informing a caller about the availability of multiple callees.

When a caller invites multiple callees to a call, the notification 134 may be displayed when at least one of the callees becomes available. Alternatively or in addition, as shown in FIG. 1G, a notification 138 may be delayed until all of the original recipients become available. The notification 138 may be associated with a selectable option 140 to invite all of the recipients to join the call. In other embodiments, notifications may be displayed when a specified number or proportion of callees are available, or when specified subgroups of callees become available.

Figure 1H:
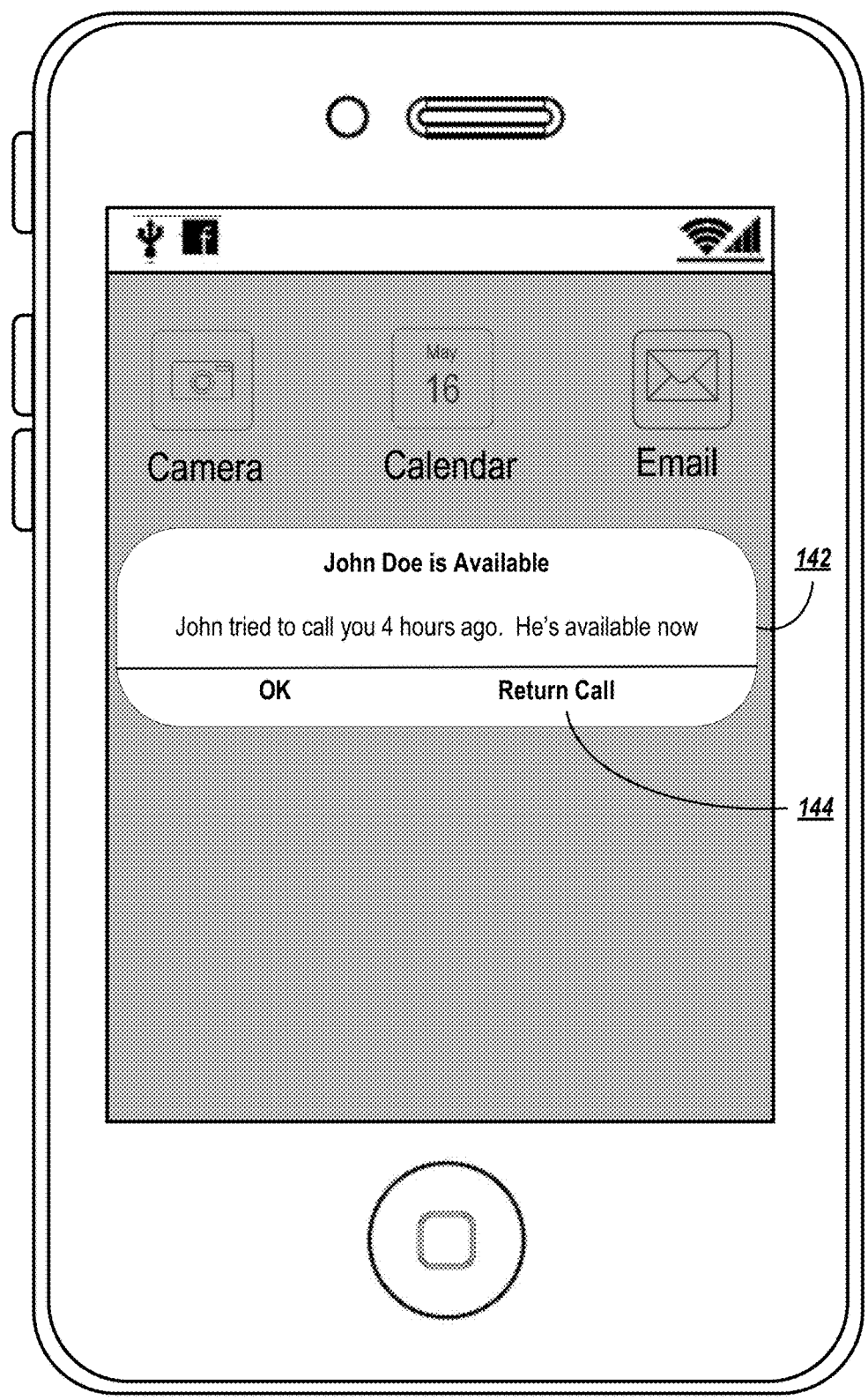
FIG. 1H depicts an exemplar y interface for informing a callee about the availability of a caller.

The status of the original caller may also be monitored and sent to the callees. For example, FIG. 1H depicts an exemplary notification 142 displayed on a callee client device, indicating that the caller is available for a return call. Additional information about the caller's status and details of the previously-attempted call may also be displayed. A selectable option 144 may be associated with the notification 142, which invites the original caller into a call with the callee upon selection.

Alternatively or in addition to monitoring the caller's and/or callees' statuses, an answering window may be provided, as illustrated in FIGS. 2A-2F.

Figure 2A:
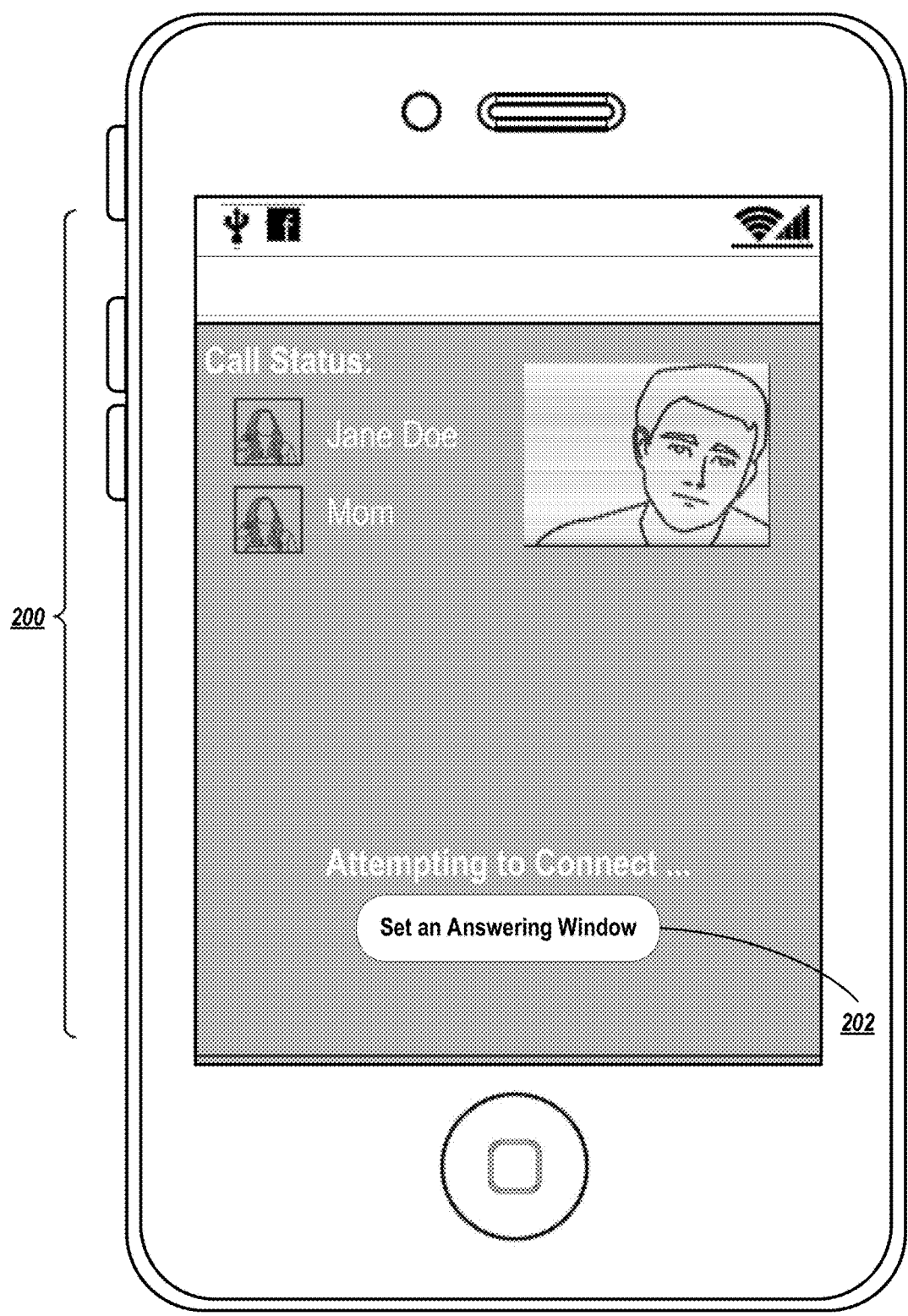
FIG. 2A depicts an exemplary interface for toggling an answering window.

FIG. 2A depicts an exemplary lobby interface 200 that may be displayed when a caller invites one or more callees to join in a synchronous video communication. The lobby interface 200 may include a selectable element 202 to set an answering window. The answering window may provide a period of time during which the invitation to join in the call will remain open to the recipients (or a time at which the invitation will be canceled).

Figure 2B:
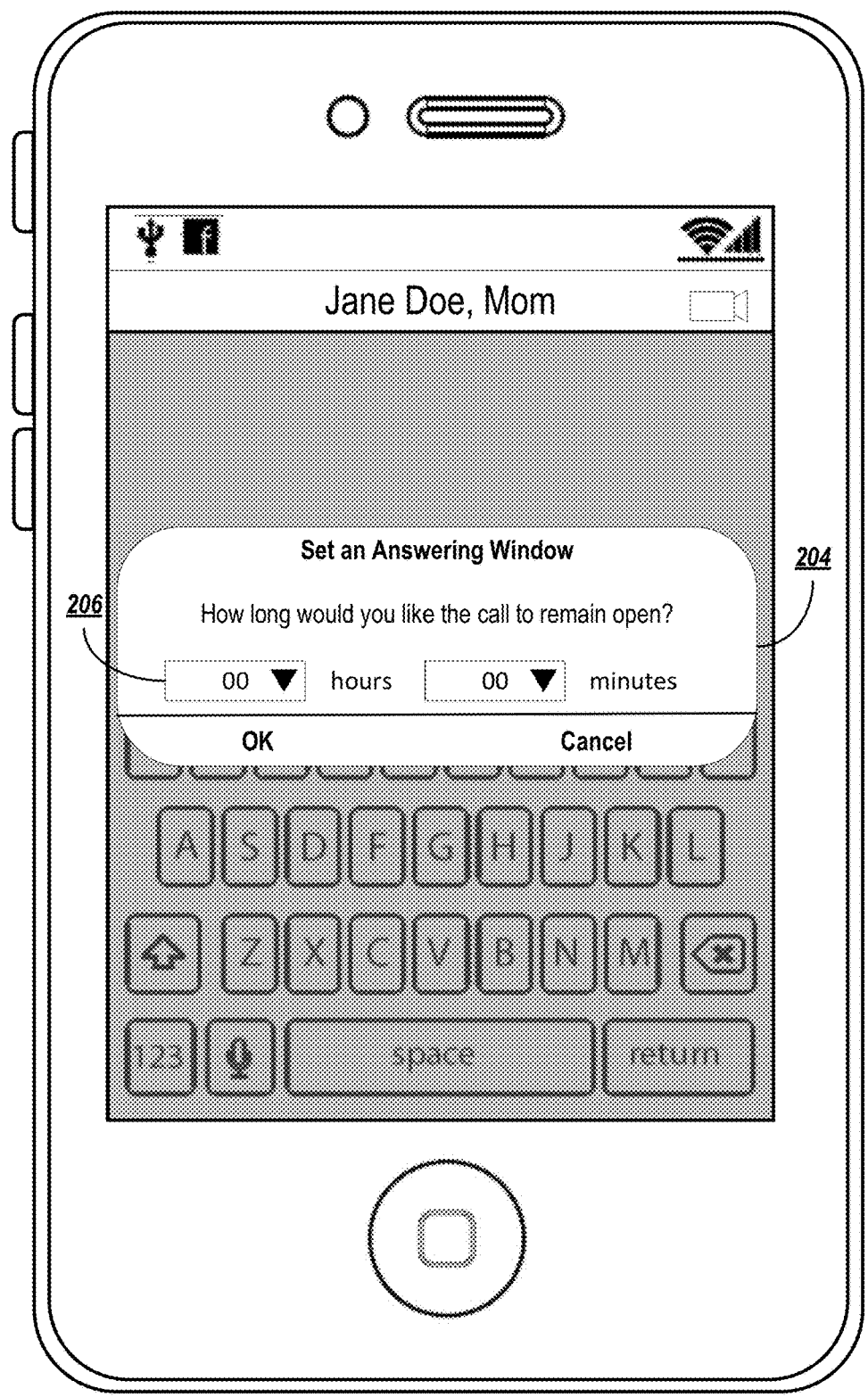
FIG. 2B depicts an exemplary interface for manually selecting a length of an answering window.

Upon receiving a selection of the selectable element 202, the caller's client device may cause an answering window prompt 204 to be displayed, as shown in FIG. 2B. The answering window prompt 204 may allow a user to manually select a length of time for which the invitation to join the call should remain open to the recipients. In this example, a number of time duration selection elements 206 allow a user to manually set a length of time (e.g. a number of hours and/or minutes) during which the answering window will remain open. Alternatively or in addition, the user may specify an end time (e.g., "1:00 PM") at which the answering window will expire.

Figure 2C:
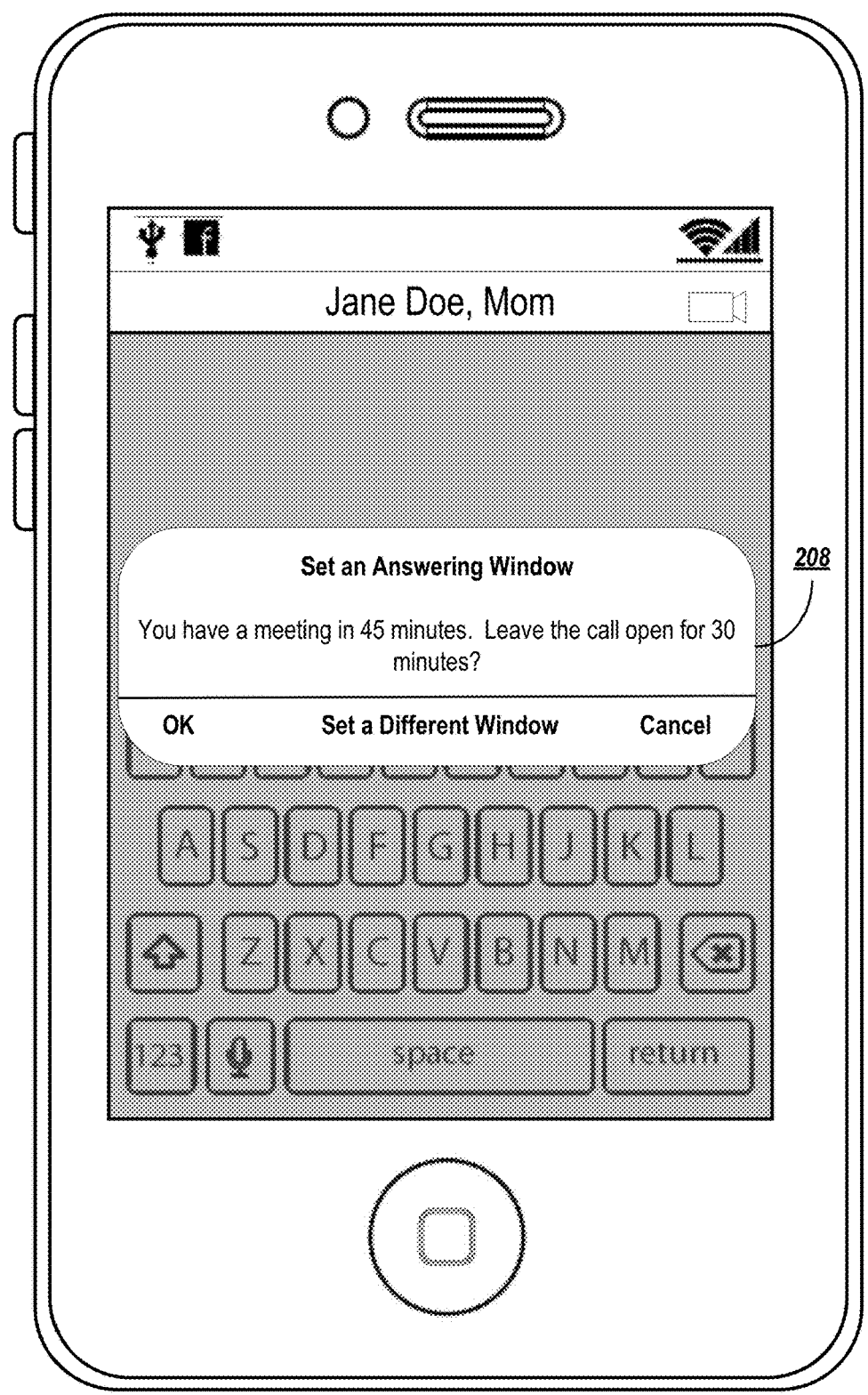
FIG. 2C depicts an exemplary interface for automatically recommending a length of an answering window.

Alternatively or in addition, the client device may recommend an automatically-selected answering window. The automatic selection may be made based on user preference (configured by the user or learned by the communications or another application), or may be based on the caller's schedule. FIG. 2C depicts an example of a prompt 208 suggesting an amount of time to serve as a call answering window. The prompt may include options to accept the recommended window or modify the window (e.g., using a dialog such as the one depicted in FIG. 2B).

Figure 2D:
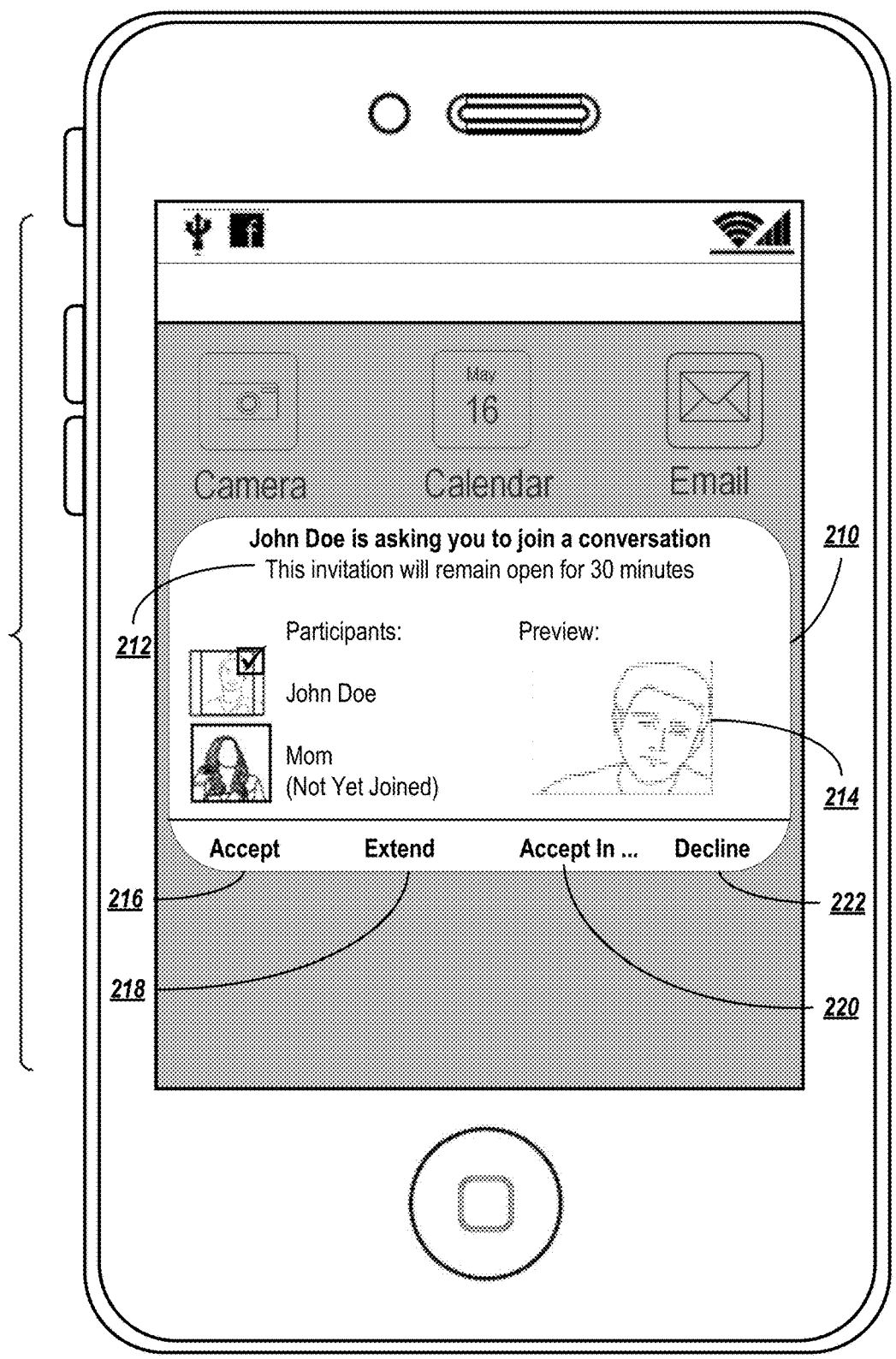
FIG. 2D depicts an exemplary interface providing answering window options to a callee.

FIG. 2D depicts an exemplary interface 210 displayed on a callee client device in response to a caller inviting the callee to participate in a call with an associated answering window.

The interface 210 may identify the participants invited into the real-time communication, the status of each participant (e.g., joined vs. not joined, available vs. not available, etc.) and the organizer of the call. An indication 212 may be presented on the interface 210 for identifying the length of time or expiration time of the call answering window. If the caller is streaming audio and/or video, a preview window 214 may be displayed to present the streaming audio and/or video.

The interface 210 may further provide a list of options for responding to the invitation.

Figure 3A:
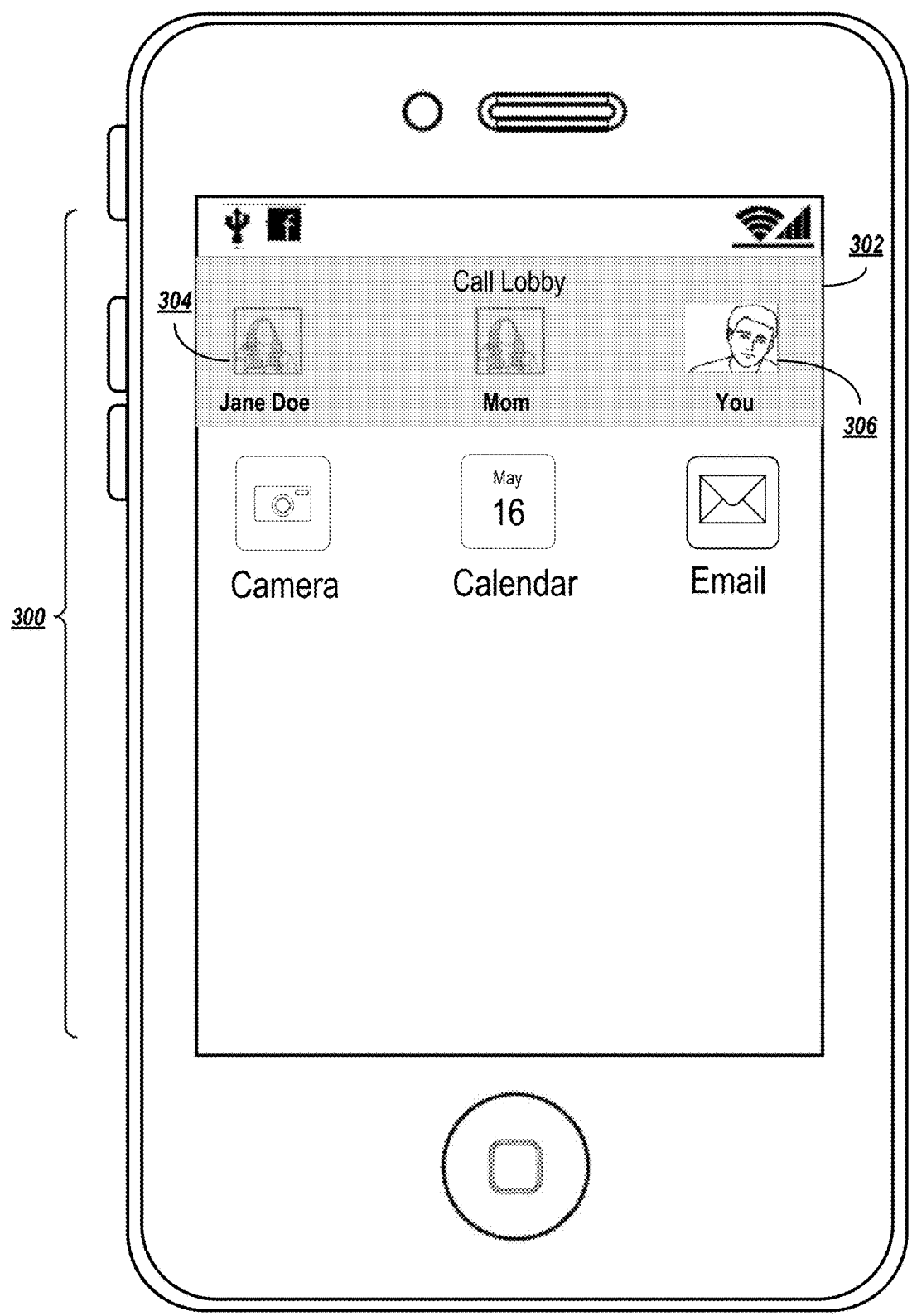
FIG. 3A depicts an exemplary interface for displaying a minimized call lobby.

The list of options may include an option 216 to accept the invitation. Upon accepting the invitation, the interface may change to display a synchronous video communications interface (FIG. 3C). The synchronous video communications interface may be similar to the interface displayed on the original sender's device (with the exception that the preview window may display the current user, and the display windows may reflect the other participants).

The list of options may further include an option 218 to request that the answering window be extended. If the callee is unable to accept the call within the answering window, but could do so shortly thereafter, then selecting the option 218 may provide an interface to allow the callee to an amount of time (or an ending time) to which the call window should be extended. Such an interface may be similar to the caller interfaces depicted in FIGS. 2B and 2C.

The list of options may further include an option 220 to notify the caller of the timing at which the callee expects to be able to participate in the call. For example, the callee may indicate that they expect to join the call in a certain amount of time (e.g., in ten minutes) or at a certain time (e.g., at 1:15 PM). Providing such an option allows the callee to flag for the caller that the invitation has been received and that the callee expects to participate in the call, and further sets the caller's expectations about when the call should be able to take place.

The list of options may further include an option 222 to expressly reject the invitation. Upon selecting the option to reject the invitation, the communications system may be informed of the rejection. Optionally, the interface of the caller may be updated to reflect that the recipient has rejected the invitation. The invitation may also be implicitly rejected if the recipient's communication device and/or messaging account is offline, or if the recipient fails to respond to the prompt 210 (e.g., within a predetermined period of time, or before the invitation is rescinded because the sender completes recording of the video).

The list of options may also include an option to defer action and minimize the prompt 210. By selecting defer, the invitation may be minimized (for example) to allow the recipient to continue in whatever tasks they might be participating. As long as the answering window remains open, the recipient can return to the prompt 210 and accept at any time.

Figure 2E:
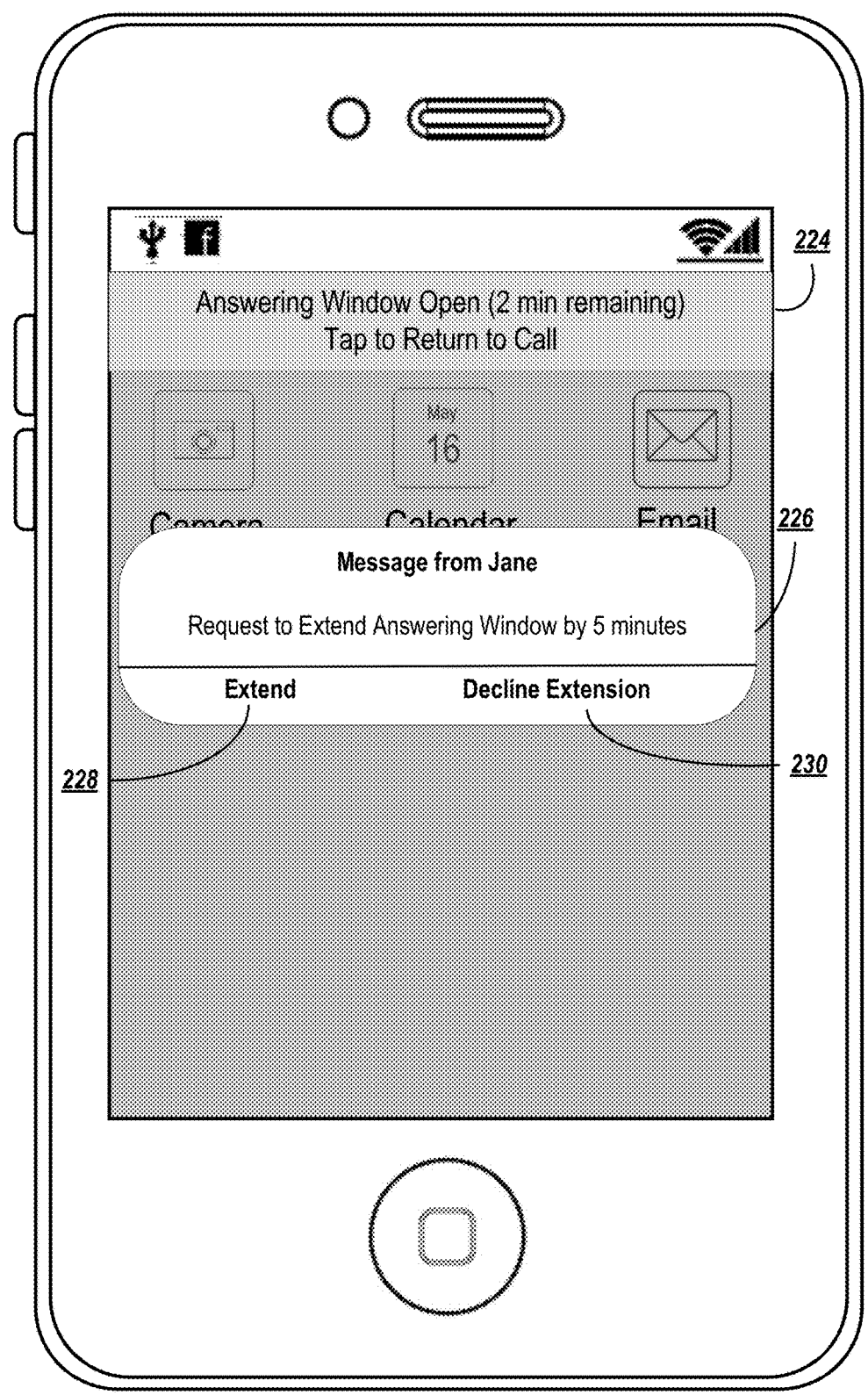
FIG. 2E depicts an exemplary caller interface for accepting or rejecting an extension to the answering window.

If the callee selects the extend option 218, a request to extend the answering window may be sent to the caller's client device. FIG. 2E depicts an exemplary prompt 226 displayed on the caller's client device in response to such a request. The prompt 226 may indicate which callee has requested the extension, and the amount of (or ending time of) the requested extension. The caller may be provided with an option 228 to accept the extension and/or an option 230 to decline the extension.

In these and other interfaces, an answering window status bar 224 may be displayed, e.g. at the top of the user's currently-active interface. The answering window status bar 224 may be displayed on the caller's and/or callees' client devices. The answering window status bar 224 may indicate that a call has a currently-active answering window, may indicate how much time is left in the answering window (or the time at which the answering window will expire), and may provide or may be a selectable interface element that, upon selection, takes the user to the call lobby (e.g., as shown in FIG. 1D)

Figure 2F:
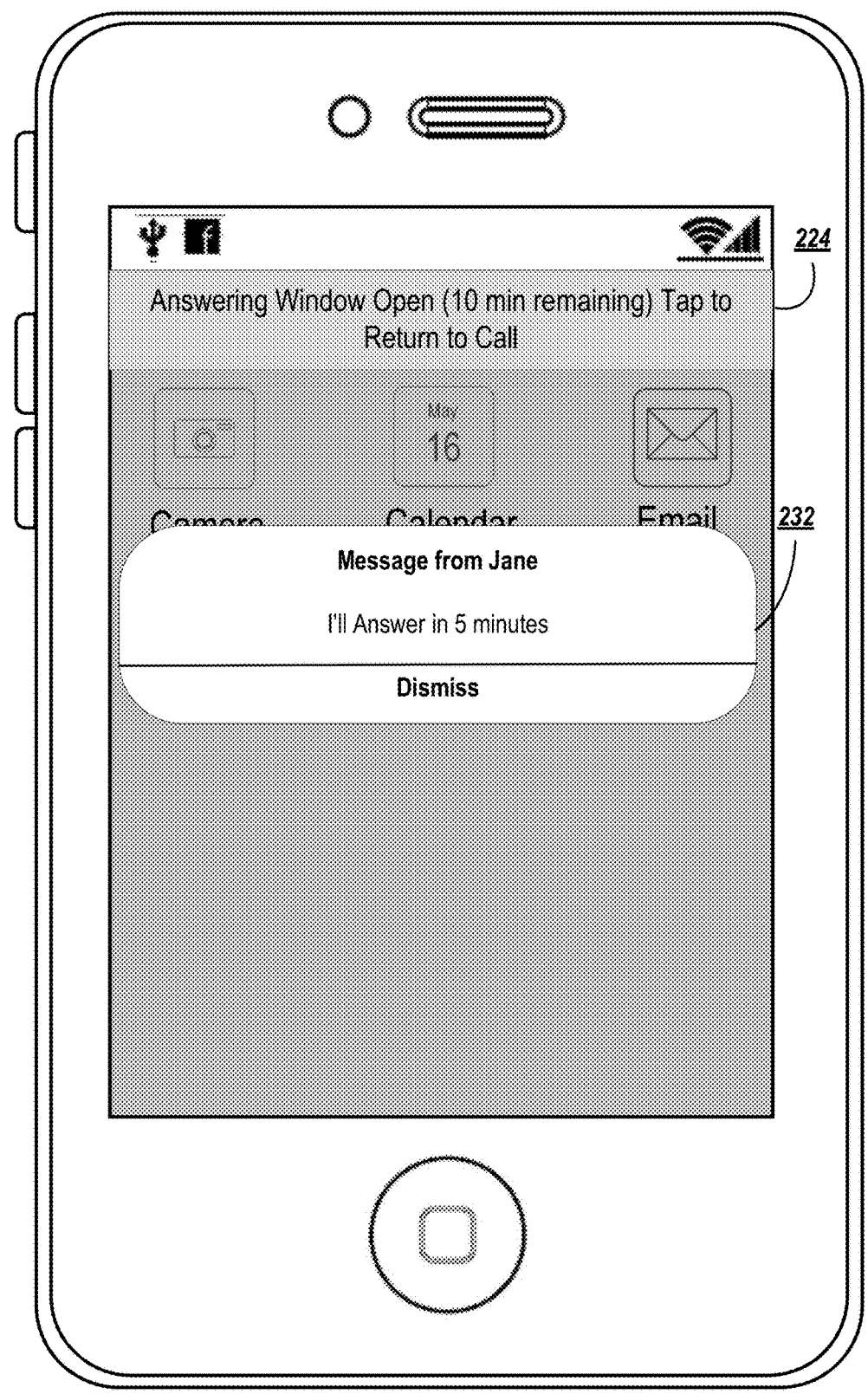
FIG. 2F depicts an exemplary caller interface for receiving an indication of when the callee intends to respond.

If the callee indicates a time at which they will answer (e.g., by selecting the timing notification option 220 in FIG. 2D), then a notification of the callee's anticipated answering timing may be sent to the caller's client device. FIG. 2F depicts an exemplary display element 232 displayed on the caller's client device in response to such a notification. The display element 232 may indicate which callee has notified the caller of the timing for the call and an expected time at which the identified callee expects to be able to answer.

Throughout the process, the answering window status bar 224 may be displayed on the currently-active interface, as shown in FIG. 2F. Alternatively, a minimized version of the call lobby may be displayed, as shown in FIG. 3A.

The minimized version of the call lobby 302 may be displayed on whichever interface 300 is currently active on the client's communications device. The interface may be scaled to fit in the remaining display space available after accounting for the minimized version of the call lobby 302, or the minimized version of the call lobby 302 may be capable of being hidden or removed entirely in order to access interface elements covered by the minimized version of the call lobby 302.

The minimized version of the call lobby 302 may include status indicators 304 indicating a current status of other participants invited to join the call. Optionally, the minimized version of the call lobby 302 may include a preview window 306 for presenting streaming audio and video being transmitted from the caller (or the currently-active user).

Figure 3B:
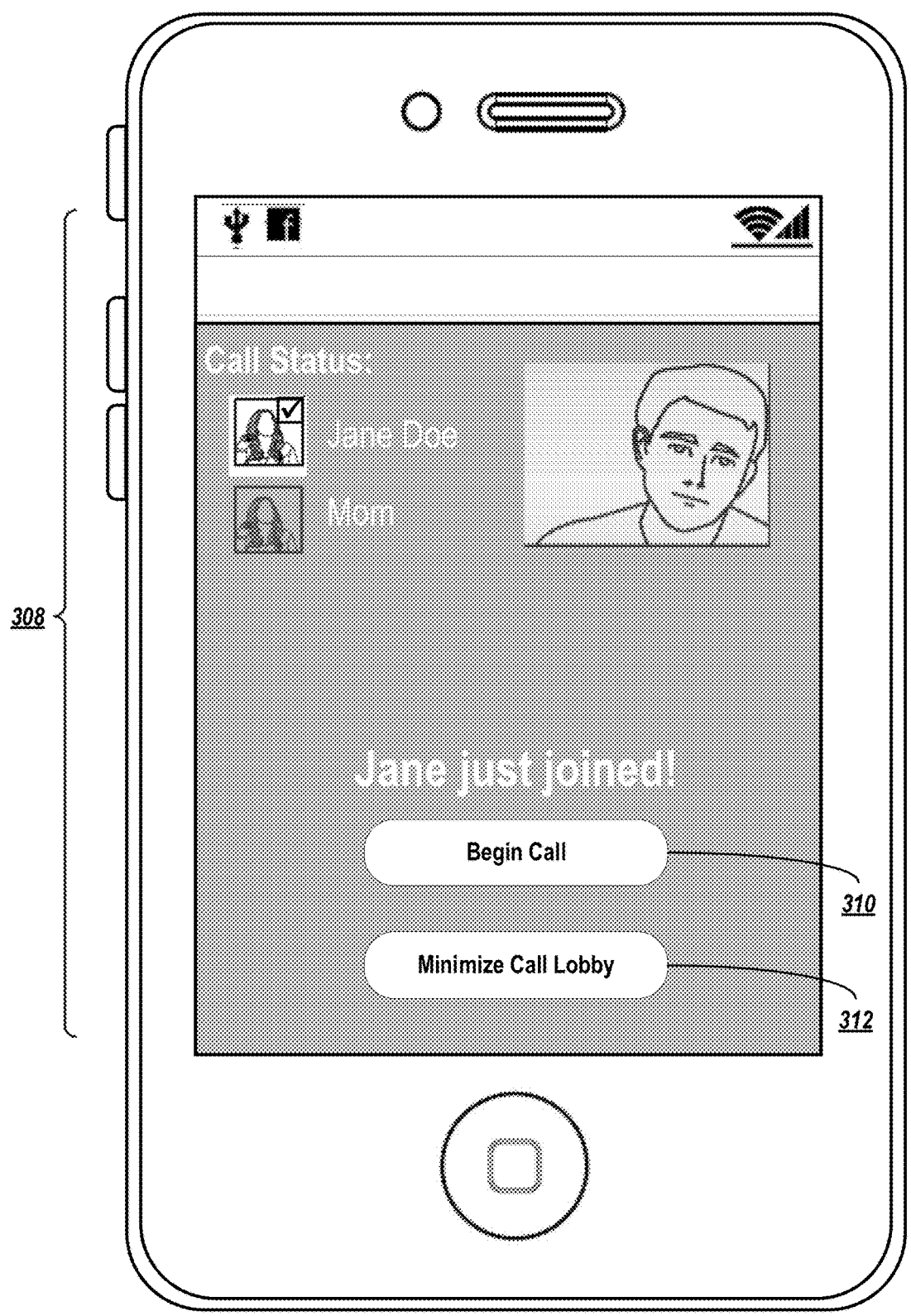
FIG. 3B depicts an exemplary interface for accepting a call with a callee that has recently entered the call lobby.
Figure 3C:
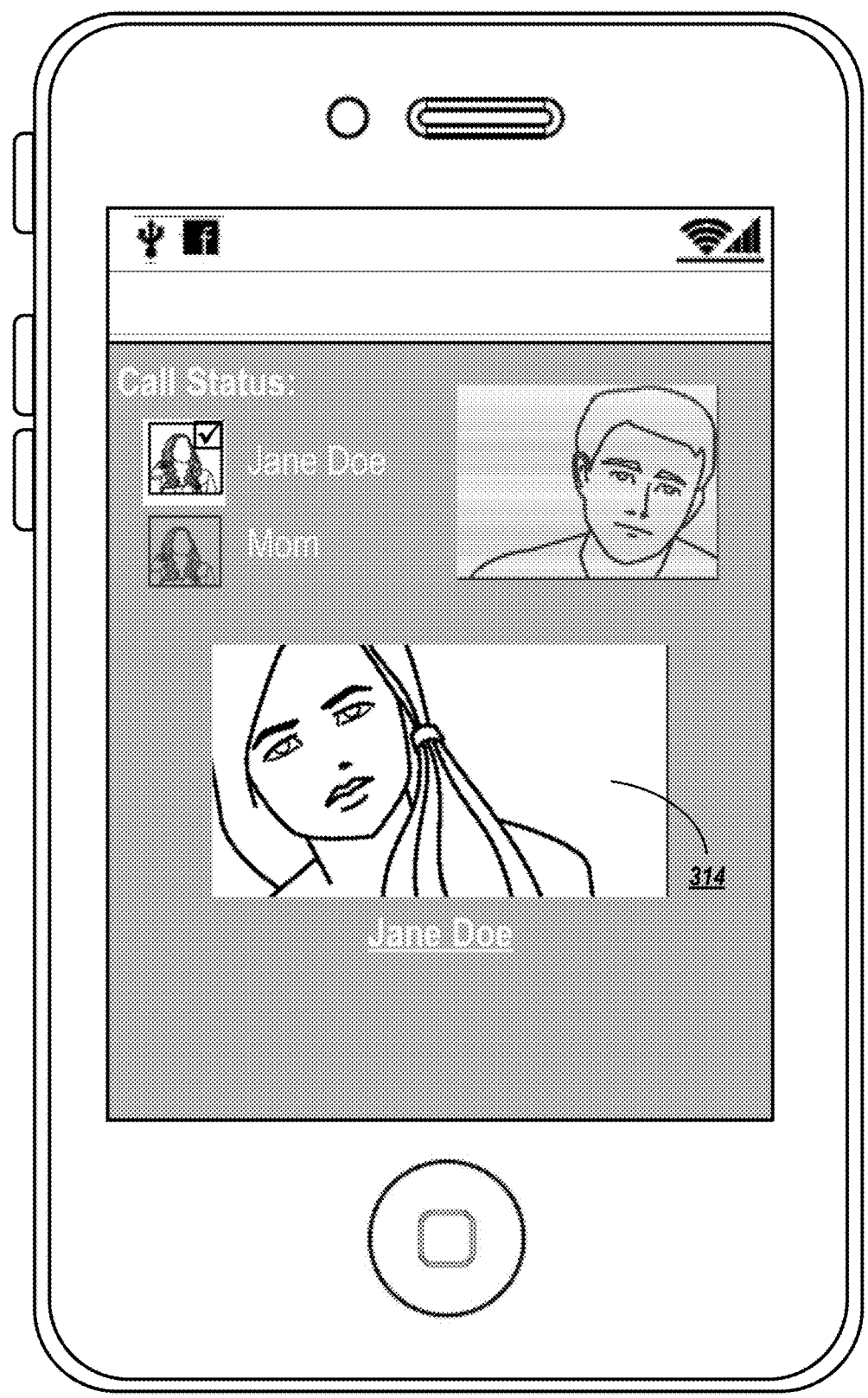
FIG. 3C depicts an exemplary interface for participating in a video call.

If one or more of the recipients joins the real-time communication, the caller may be taken to a full-sized version of the call lobby 308, as shown in FIG. 3B. The status indications in the lobby interface may change in order to reflect which recipient(s) have joined the call. The call lobby 308 may include an interface element 310 allowing the caller to move any active participants out of the call lobby and to join an active call. Another element 312 may allow the lobby interface 308 to be switched back to a minimized version of the call lobby.

When the user selects the interface element 310 (or automatically upon one or more callees joining the call, depending on the embodiment), the caller and/or callees may be presented with a call interface, as shown in FIG. 3C. One or more display windows 314 may appear (e.g., one for each recipient that has joined the call), and the synchronous video communication may commence.

This brief summary is intended to serve as a non-limiting introduction to the concepts discussed in more detail below, in connection with FIGS. 4A-8C. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Figure 4A:
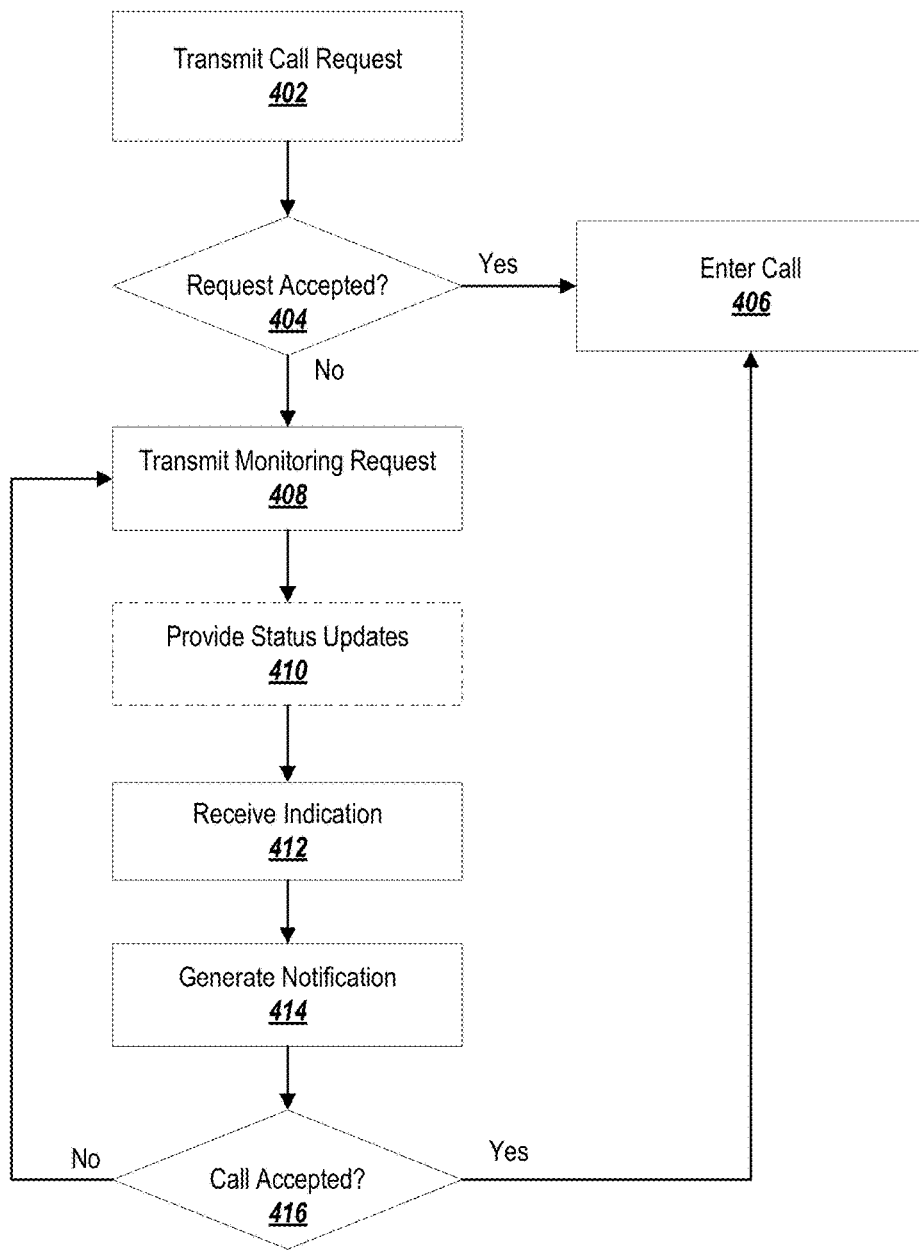
FIG. 4A is a flowchart depicting exemplary caller client-side status logic.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided Monitoring Call Participants' Statuses Any or all of the above-described interfaces may be presented as part of a set of procedures for providing status updates in order to notify users of appropriate times at which to retry or return calls. FIG. 4A is a flowchart depicting an exemplary process 400 for receiving and/or transmitting status updates from the perspective of a caller client device.

At block 402, the client device may transmit a call request to a communications server configured to facilitate synchronous video communications between two more users. The call request may identify one or more callees that are invited to participate in the call. The call request may be generated in response to receiving an instruction to initiate a call (e.g., an instruction sent in response to receiving a selection of an interface element, such as the interface element 124 of FIG. 1C).

At block 404, the client device may determine if the request has been accepted. For example, the client device may determine if an acceptance of the request has been received from the communications server within a predetermined period of time (or before the caller has rescinded the request). If the answer at block 404 is "YES" (i.e., the request has been accepted), then processing proceeds to block 406 and the client device takes any actions necessary for joining the call. For example, the client device may interact with the communications server to establish a synchronous video link between the caller and the available callees. If the answer at block 404 is "NO" (i.e., the request has not been accepted), then processing may proceed to block 408 and the client device may begin the process of monitoring the callees for status updates.

In some cases, the request may be accepted by some, but not all of the callees. In this case, processing may proceed to block 406 or 408, depending on the application and/or user preferences. In some embodiments, the caller may enter a video call with the available callees, and may monitor the remaining (unavailable) callees to determine whether they become available (in some embodiments, this monitoring may persist for the length of the call, to allow the unavailable callees to join a call already in progress, while in others the monitoring may occur for a length of time similar to the length determined below in block 408).

At block 408, the caller's client device may transmit a monitoring request to the communications server and/or the client device(s) of the callee(s). The monitoring request may be a request for status updates when the callees interact with their devices. For example, callee availability may be inferred based on the callee's presence in a messaging or social networking application associated with the communications server and/or other infrastructure used to initiate or facilitate the attempted video call. For example, the callee may be considered available when logged into and/or active in such an application. The callee may be considered unavailable when logged out of, inactive, or otherwise unreachable through the application.

The availability may be inferred based on the user's presence or activity in a third-party application unassociated with the attempted video call. For example, if the user's client device accesses a server associated with the third party application, logs into the third party application, or is otherwise active or using the third party application, it may be assumed that the user is engaged with the client device and therefore potentially available to accept a call.

Still further, availability may be inferred from the power state of the user's client device. For example, if the device is powered on and/or awake, then the user may be determined to be available. If the device goes to sleep or is powered off, the user may be determined to be unavailable.

Other techniques for determining user availability may also be used. In some embodiments, the availability may be updated when the user becomes unavailable, to provide up-to-date statuses for the user.

At block 410, the caller's client device may optionally provide status updates to the communications server and/or the callees' client devices. The status updates may be based on the same, or similar, considerations as those discussed above in block 408. The status updates may be used to inform the callee when the caller is available, which may allow the callee to select an appropriate time at which to return the caller's call.

At block 412, the caller client device may receive an indication of callee availability from the callee's client device and/or the communications server. At block 414, the caller client device may generate and display a notification of callee availability in response to the indication, similar to the interface described in connection with FIG. 1F. In some embodiments, the caller client device may wait to display such an interface until all, or at least a subset, of the callees invited to the original call are available. In those cases, the caller client device may display an interface similar to the interface described in connection with FIG. 1G.

At block 416, the client device may receive an instruction to retry the call that was rejected in block 404. As a result, the client device may transmit a new request to engage in synchronous video communication. The client device may determine whether the new request has been accepted.

If the answer at block 416 is "YES" (i.e., the new request has been accepted), then processing may return to block 406 and the client device may enter into a video call with the callee(s).

If the answer at block 416 is "NO" (i.e., the new request has not been accepted), then processing may return to block 408 and a new monitoring request may be transmitted. Alternatively, the client device may terminate monitoring for a cool-down period (e.g., a certain number of hours), and may resume monitoring when a new call is made after the cool-down period (or may resume monitoring after the cool-down period, regardless of whether a new call is made).

FIG. 4B depicts an exemplary process 450 for receiving and sending status updates, from the perspective of a callee client device.

At block 452, the callee client device may receive a call request from a caller client device and/or a communications server. The call request may include an indication of the organizer of the call, a list of the other participants in the call, the status of the other participants, etc. In response to the call request, the callee client device may display an interface (such as the one depicted in FIG. 2D) to allow the callee to accept or reject the call request (among other options).

At block 454, the callee client device may determine whether the request has been accepted. The request may be expressly accepted (e.g., by interacting with the "Accept" option in the interface). The request may be expressly rejected (e.g., by interacting with the "Decline" option in the interface). The request may be implicitly rejected if the callee fails to respond to the interface (e.g., in a predetermined amount of time, or before the request is rescinded by the callee). In some cases, the communications server may determine that the request has been implicitly rejected after failing to receive a response from the callee client device, and may transmit a notice of the rejection to the caller.

If the determination at block 454 is "YES" (i.e., the request has been accepted), then at block 456 the callee client device may enter a call with the caller (and any other active participants). The callee client device may take any actions necessary for joining the call. For example, the client device may interact with the communications server to establish a synchronous video link between the callee, the caller, and any other available callees If the determination at block 454 is "NO" (i.e., the request has not been accepted), then processing may proceed to block 458. At block 458, the callee client device may receive a monitoring request from the caller client device and/or the communications server. The monitoring request may be a request to monitor for certain status changes (as described above in connection with block 408 of FIG. 4A).

At block 460, the callee client device may provide status updates to the communications server and/or the caller client device. The callee client device may provide such updates any time the callee's status changes (e.g., going from logged-in to a messaging application to logged-out of a messaging application, bringing the client device out of sleep mode, etc.).

If the caller device is not configured to send optional status updates to the callee device (for purposes of flagging appropriate times for a return call), then processing may optionally end at block 460 (or may return to block 452 upon receipt of a new call request). If the caller device is configured to send the optional status updates, then processing may proceed to block 462.

At block 462, the callee client device may receive an indication of caller availability from the caller's client device and/or the communications server. At block 464, the callee client device may generate and display a notification of caller availability in response to the indication, similar to the interface described in connection with FIG. 1H. In some embodiments, the callee client device may wait to display such an interface until all, or at least a subset, of the callees invited to the original call are available. In those cases, the callee client device may display an interface similar to the interface described in connection with FIG. 1G.

Assuming the callee opts to return the caller's call, then at block 466 the callee's client device may transmit a call request to the caller (and/or any other callees from the original call request). At block 468, it may be determined whether the new call request has been accepted.

If the determination at block 468 is "YES" (i.e., the call request has been accepted), then processing may return to block 456, and the callee client device may enter the call with the caller. If the determination at block 468 is "NO" (i.e., the call request has not been accepted), then processing may proceed to block 470. At block 470, the callee client device may transmit a rejection of the call request to the communications server and/or the caller client device.

Figure 5:
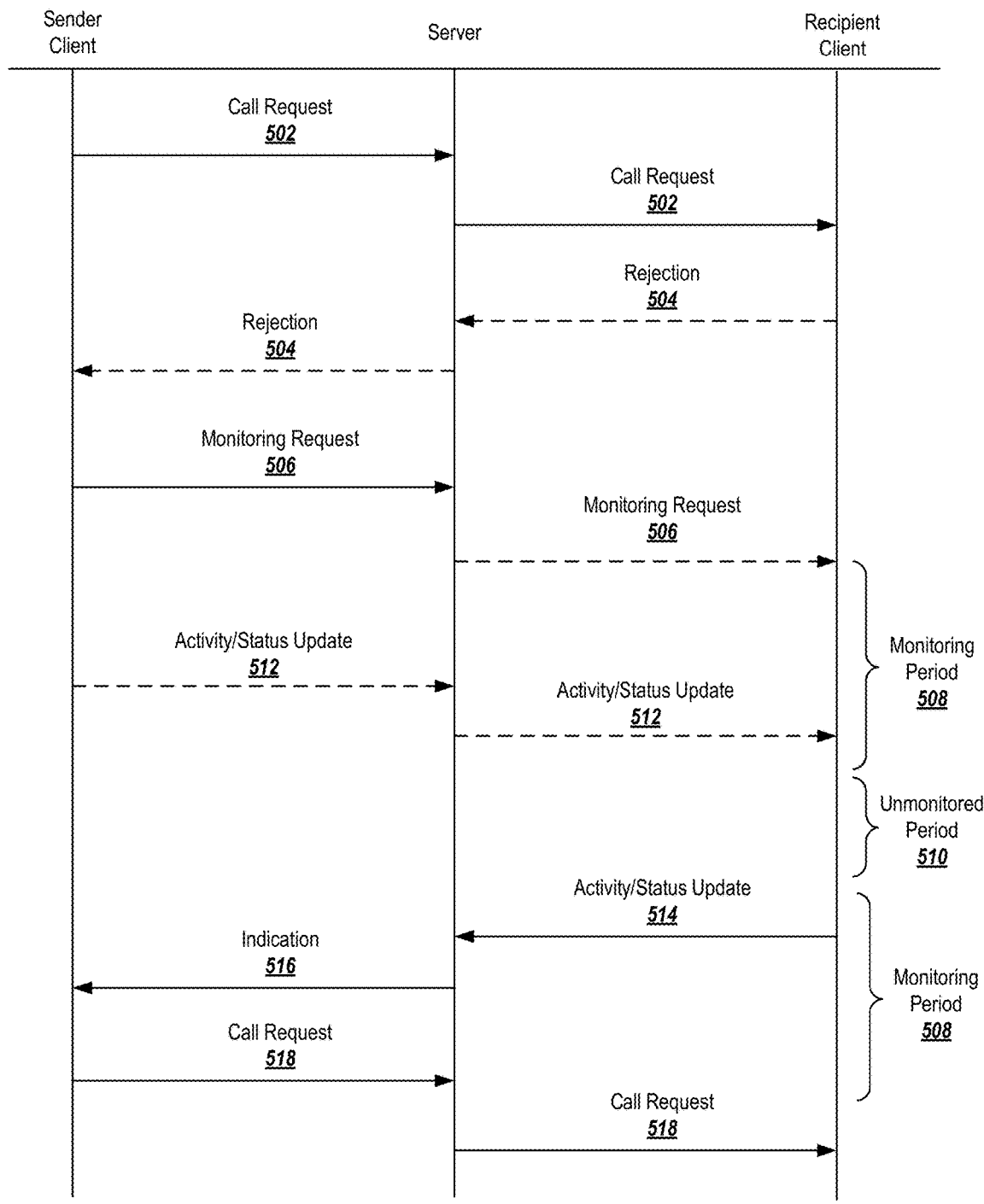
FIG. 5 is a data flow diagram depicting information exchange between various devices, according to an exemplary embodiment in which a callee's status is monitored.

FIG. 5 is a data flow graph depicting exemplary exchanges of data between the above-mentioned caller client device, callee client device, and a server device.

A sender device may transmit a call request 502 to a communications server, and the communications server may process the call request 502 and forward the call request 502 to any recipient clients identified in the call request. Optionally, the recipient client may transmit a rejection 504 of the call request 502 to the communications server. In some embodiments, the communications server may infer the rejection of the call request based on a failure to receive a response from the recipient client in a predetermined amount of time (or before the request is rescinded). Optionally, the server may transmit the rejection 504 to the sender client. In some embodiments, the sender client may infer the rejection of the call request based on a failure to receive a response from the recipient client and/or the server.

In response to receiving or inferring the rejection 504, the sender client may transmit a monitoring request 506 to the server. In response, the server may begin monitoring the status of the recipient client (e.g., determining whether the recipient client logs into or otherwise communicates with the server). The server may optionally forward the monitoring request 506 to the recipient client, so that the recipient can provide status updates that the server might not otherwise have access to (e.g., obtaining the power status of the recipient client device). In some embodiments, the server may also forward the monitoring request to third parties, such as servers for other applications unaffiliated with the attempt to engage in a video call, to retrieve further status updates from the third parties.

The monitoring request 506 may specify a monitoring period 508 during which to monitor the recipient client. Alternatively or in addition, a default monitoring period 508 or predetermined monitoring period 508 may be set. The monitoring period 508 may be for a predetermined or specified amount of time. The amount of the monitoring period 508 may be depending on the number of callees asked to participate in the call (e.g., for a call with a large number of callees, a relatively longer monitoring period 508 may be set as compared to a call with fewer callees).

The monitoring period may be interrupted by unmonitored periods 510. The unmonitored periods 510 may be specified in the monitoring request 506, may be predetermined (e.g., the unmonitored period 510 may include nighttime hours), or may be determined based on the schedule of the caller and/or the callee. For example, when the caller and/or callee are in meetings or other appointments, as reflected in their schedules (e.g., retrieved through API calls to calendar applications), their statuses may remain unmonitored.

Optionally, the sender client may transmit activity and/or status updates 512 to the server, which may be forwarded to the recipient client (for purposes of determining an appropriate time to return the call). The updates 512 may be transmitted whenever the status changes, when an event occurs, or periodically.

The recipient client may transmit activity or status updates 514 to the communications server and/or the sender client. In response to the updates 514, the server may generate an indication of callee availability 516 and transmit the indication to the sender client.

Upon receiving the indication, the sender client may generate a notification to be displayed to the sender, allowing the sender to initiate a follow-up call while the callee is available. In response to initiating such a follow-up call, a call request 518 may be sent from the caller to the server and/or the recipient client.

Managing an Answering Window

Figure 6A:
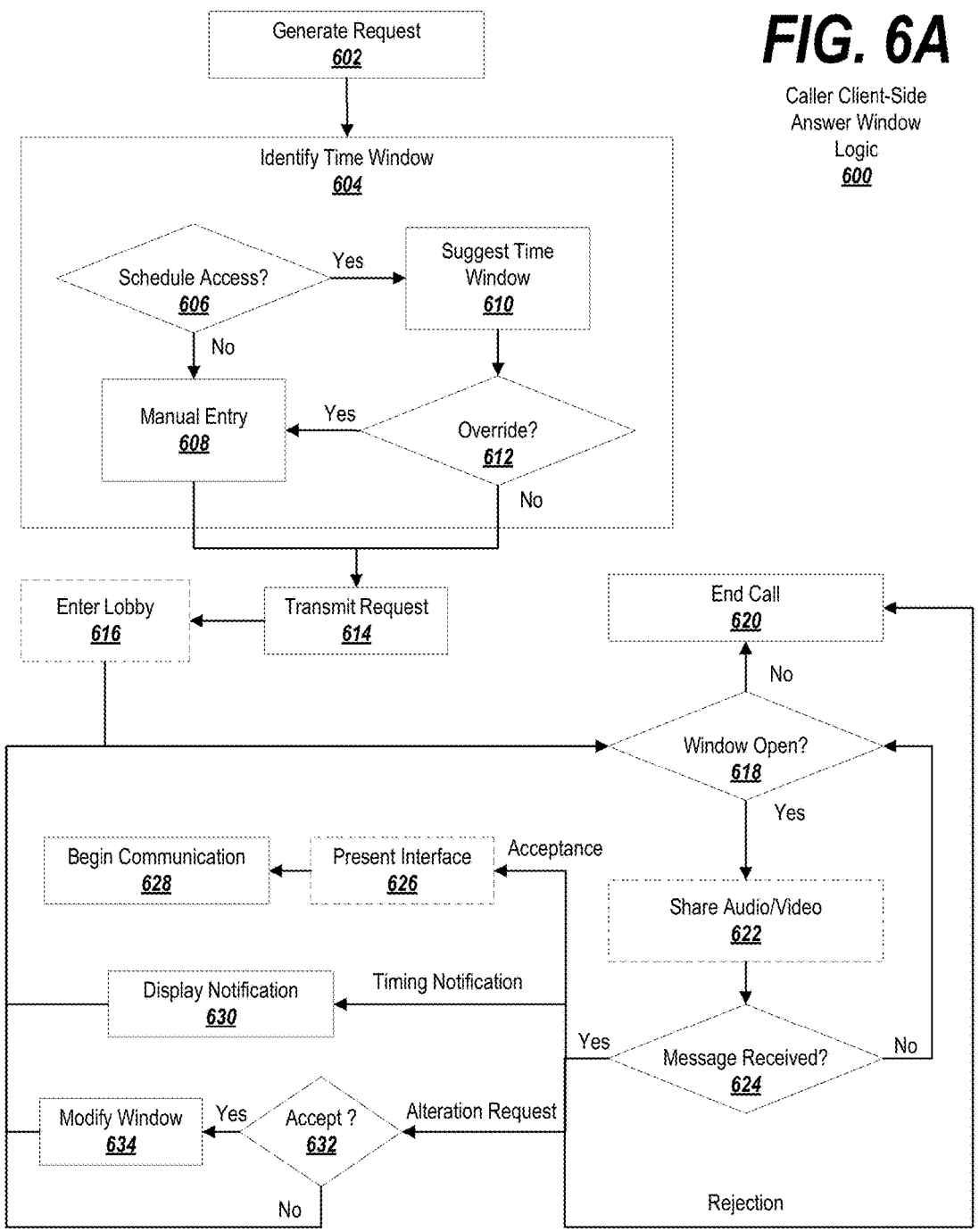
FIG. 6A is a flowchart depicting exemplary caller client-side answer window logic.

Any or all of the above-described interfaces may be presented as part of a set of procedures for managing an answering window. FIG. 6A is a flowchart depicting an exemplary process 400 for creating and managing an answering window from the perspective of a caller client device.

At block 602, the client device may generate a call request. The call request may identify one or more callees that are invited to participate in the call. The call request may be generated in response to receiving an instruction to initiate a call (e.g., an instruction sent in response to receiving a selection of an interface element, such as the interface element 124 of FIG. 1C).

At block 604, the caller client device may identify a time window during which the request will remain open to the callees. In some cases, the time window may be a predetermined amount of time. In other embodiments, the time window may be dynamically determined based on manual and/or automatic selection of a time period or a time for ending the window.

For example, at block 606 the client device may determine whether it has access to a schedule for the caller. The schedule may be stored locally (e.g., in a local calendar application on the client device) or remotely (e.g., on a remote site or device distinct from the caller client device). In some cases, the client device may not be authorized to share information from the calendar application with the messaging or social networking application managing the call (in which case the answer at block 606 is "NO"). However, it may be possible to request permission from the user to share such information between applications.

If the determination at block 606 is "NO" (i.e., the client device does not have access to, or authorization to share, the user's schedule), then processing may proceed to block 608. At block 608, the caller may be presented with an interface for manually entering the time window, such as the interface depicted in FIG. 2B.

If the determination at block 606 is "YES" (i.e., the client device does have access to, or authorization to share, the user's schedule), then processing may proceed to block 610. At block 610, the schedule may be retrieved. For example, a communications application (e.g., social networking application or messaging application) may access the user's calendar (locally on the client device or remotely on a device distinct from the client device). The access may be achieved through local or remote API calls. The client device may retrieve the user's schedule for the near future (e.g., up to a predefined, preference-determined, or user-configured limit).

The client device may suggest a time window based on the retrieved schedule. For example, the time window may be selected to run from the present time until the caller has a conflict. In some embodiments, the time window is selected to allow time for the call before the conflict (e.g., the time window may run until a predetermined number of minutes before the conflict). The amount of buffer time before the conflict may be determined dynamically depending on the number and/or identity of the callees. For example, a video call with a small number of friends may not require a significant buffer, whereas a video call with a large number of business associates may be expected to take longer, thus requiring a larger buffer. The buffer may be determined based on past interactions with the callees and/or the current time of day (e.g., a caller may require a significant amount of time when speaking with their sibling in the evening time, but may require a short amount of time when speaking to their carpool leader early in the morning).

When a time window has been identified in block 610, an interface may be presented to allow the caller to confirm the time window (such as the interface depicted in FIG. 2C). At block 612, the caller may be presented with an option to override the automatically-selected time window. If the user exercises the option (i.e., the determination at block 612 is "YES"), then processing may proceed to block 608 and the user may be allowed to manually enter a different time period. If the determination at block 612 is "NO" (i.e., the user accepts the automatically generated time window), or after block 608, processing proceeds to block 614.

At block 614, the client device may transmit the call request, along with the time window, to a communications server configured to facilitate synchronous video communications between two more users and/or to one or more callee client devices.

Optionally, at block 616 the caller client device may be placed into a call lobby to await responses from the callee(s). Placing a client device into a call lobby may cause the communications server to take initial steps towards connecting the client device with other client devices, such as collecting information about the client device used to perform a handshake to connect the client device with other client devices in synchronous video communication. While in the lobby, the caller client device may display an interface, such as the interface depicted in FIG. 1D or FIG. 3A.

At block 618, it may be determined if the answering window remains open. The answering window may remain open for the time period specified in block 604, or until the time specified in block 604 (depending on whether a duration or ending time was selected), subject to any modifications as described below in connection with block 634.

The answering window may be closed before the originally-scheduled or modified end of the answering window in certain circumstances. For example, the caller may manually cancel the answering window, or the answering window may be automatically canceled upon the occurrence of certain events (e.g., the caller enters a call with different parties). If the caller's client device is turned off or otherwise disconnected from a communications connection, or if the caller disconnects from an application managing the call, then the answering window may be rescinded.

In some embodiments, a communications server may be responsible for maintaining the answering window. In these embodiments, the client device may consult the server to determine if the answering window remains open. Alternatively or in addition, the server may send a notification to the client device when the window has closed; the client device may operate on the assumption that the window remains open until such a notification is received.

At block 620 (after the answering window has closed), the caller client device may end the call. The caller may be removed from the lobby, and the server may be instructed to take any action necessary to tear down the connection between the caller and any callees.

On the other hand, if the answering window remains open ("YES" determination at block 618), then at block 622 the caller client device may optionally share audio and/or video with the callees. The callees may be provided with a stream of the audio and/or video and may optionally display and/or play the stream.

At block 624, the caller client device may determine whether a message has been received. The message may be received from the server and/or the callee device(s), and may include an acceptance of the request, a rejection of the request, a timing notification, or an alteration request. If no message has been received, then processing may delay for a predetermined time period (e.g., two seconds) and return to block 618.

If a message has been received at block 624, the caller client device may determine what type of message has been received.

In the case of an acceptance message (e.g. at least one caller has accepted the call request), processing may proceed to block 626 and the caller device may optionally present an interface to allow the caller to initiate a call. Optionally, the accepting callee may be placed into the lobby from block 616, and the interface may allow the caller to begin a call with any or all callees present in the lobby. For example, an interface like the one depicted in FIG. 3B may be presented to the caller. Once the call is initiated, at block 628 the caller client device may begin participating in synchronous video communication with the participating callee(s).

In the case of a rejection message, processing may proceed to block 620 and the call may be ended. Optionally, processing may then proceed to the blocks shown in FIG. 4A and the callee's status may be monitored.

In the case of a timing notification message (e.g., a notification from the callee as to when the callee will be available), at block 630 the caller client device may display a notification of when the callee expects to be able to answer the call. For example, the caller client device may display a notification similar to the one depicted in FIG. 2F. Processing may then return to block 618.

In the case of an alteration request (e.g., a request to alter the answering window), at block 632 the client device may determine whether the caller has accepted the alteration request. For example, the client may display an interface similar to the one depicted in FIG. 2E and may receive a selection from the interface. If the user declines the extension, then the answering window may remain unchanged and processing may return to block 618.

If the user accepts the extension request (i.e., "YES" determination at block 632), then at block 634 the client may modify the answering window. If the client device is managing the answering window, then the amount of time remaining in the answering window may be augmented in accordance with the request, or the time at which the answering window expires may be set to the time specified in the request. If the server is maintaining the answering window, then the client device may instruct the server to modify the answering window in a suitable manner. Processing may then return to block 618 to await a new message or the expiration of the answering window.

Figure 6B:
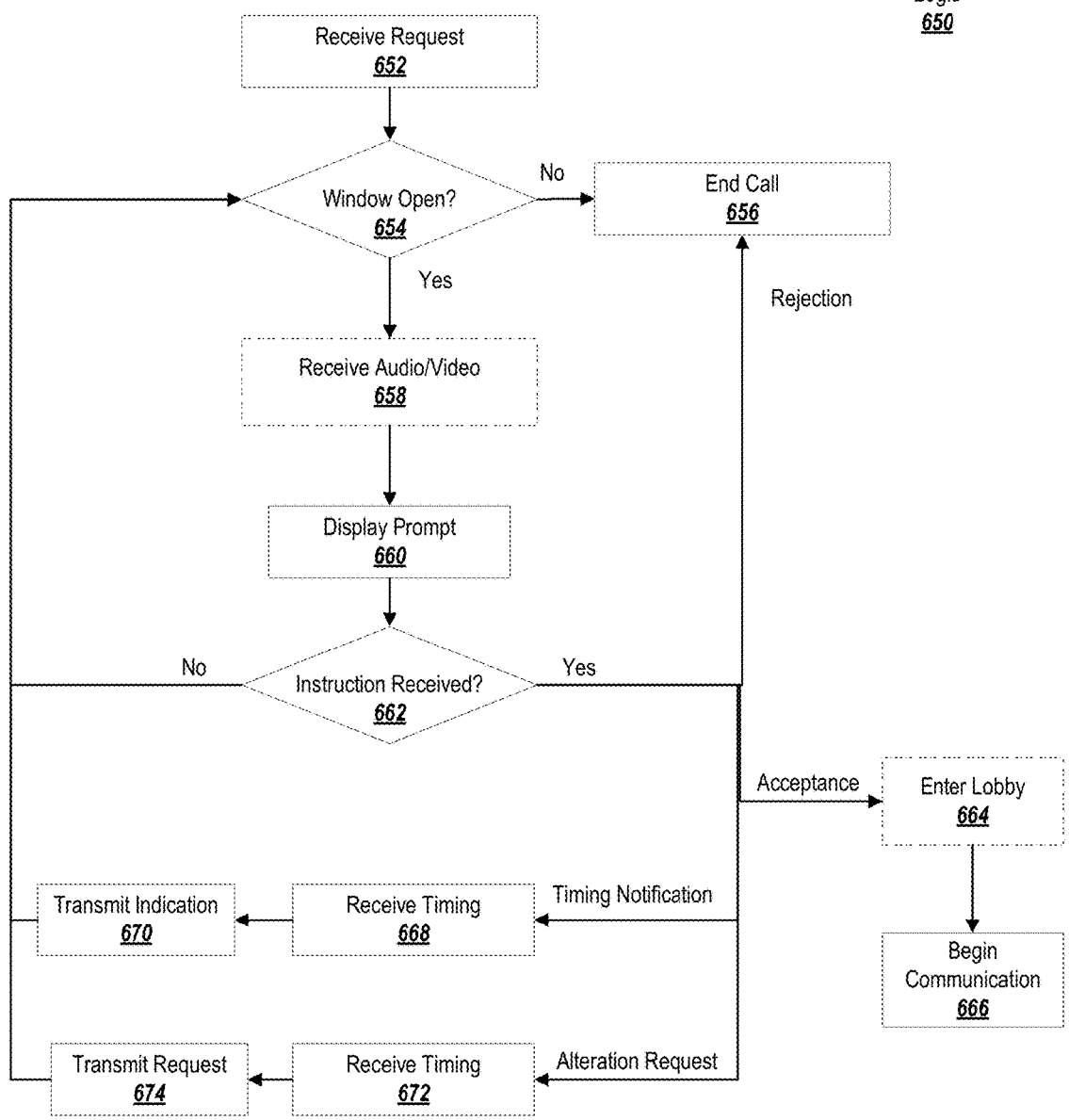
FIG. 6B is a flowchart depicting exemplary callee client-side answer window logic.

FIG. 6B depicts an exemplary process 450 for managing an answering window, from the perspective of a callee client device.

At block 652, the callee client device may receive a call request from a caller client device and/or a communications server. The call request may include an indication of the organizer of the call, a list of the other participants in the call, the status of the other participants, etc.

At block 654, the callee client device may determine whether the answering window remains open. The callee client device may consult the request received at step 652 and/or any alterations that have been approved by the caller. In some embodiments, the callee client device may be informed of the time remaining in the answering window, or the time at which the answering window closes, or whether the answering window is still open, by the server.

If the determination at block 654 is "NO" (i.e., the answering window is not open), then at block 656 the callee-client side device may end the call. Any prompts displayed in relation to the call may be canceled, and any actions taken to perform initial set-up of the call may be reversed. If the server has been instructed to perform any steps in the initial set-up of the call, the callee client device may instruct the server to perform any necessary tear-down operations.

At block 658, the callee client device may optionally receive and display/play any streamed audio/video transmitted by the caller client device.

At block 660, the callee client device may, in response to the call request, display an interface (such as the one depicted in FIG. 2D) to allow the callee to accept or reject the call request (among other options).

At block 662, the callee client device may determine whether an instruction has been received through the interface. If not, then processing may return to block 654. If so, then the callee client device may determine which kind of instruction has been received.

In the case of an express rejection of the call, processing may return to block 656 and the call may be ended.

In the case of an acceptance of the call, processing may proceed to block 664 and the callee may optionally be placed into a lobby with the caller and any other participating callees. The callee may instruct the server to perform initial setup operations so that the interaction can be quickly transitioned into a synchronous video call if the caller converts the interaction to a call. Processing may then proceed to block 666, and the caller and callee(s) may engage in a video call.

In the case of a timing notification, processing may proceed to block 668 and the client may receive a timing notification from the callee. For example, the client may present an interface allowing the user to manually select an amount of time or a specified time at which the callee expects to accept the call. The client may optionally present an automatic recommendation (e.g., based on user preferences, scheduling information, or historical user information), which may be overridden by the callee or accepted. At block 670, the callee client device may transmit the timing notification to the server and/or the caller client device. Processing may then return to block 654.

In the case of an alteration request, at block 672 the callee client device may receive a specification of the amount of the alteration. For example, the client may present an interface allowing the user to manually select an amount of time or a specified time to which the answering window should be extended. The client may optionally present an automatic recommendation (e.g., based on user preferences, scheduling information, or historical user information), which may be overridden by the callee or accepted.

In some embodiments, the maximum extension requestable by the callee may be limited. The limit may be set, for example, based on the original amount of the answering window (e.g, the answering window may be extended by, at most, 100%), based on the caller's preferences, or based on the caller's or another participant's schedule (e.g., the answering window may not be extended so as to conflict with an appointment in the caller's schedule, as determined in block 604 of FIG. 6A), among other possibilities.

At block 674, the callee client device may transmit the alteration request to the server and/or the caller client device. Processing may then return to block 654.

Figure 7:
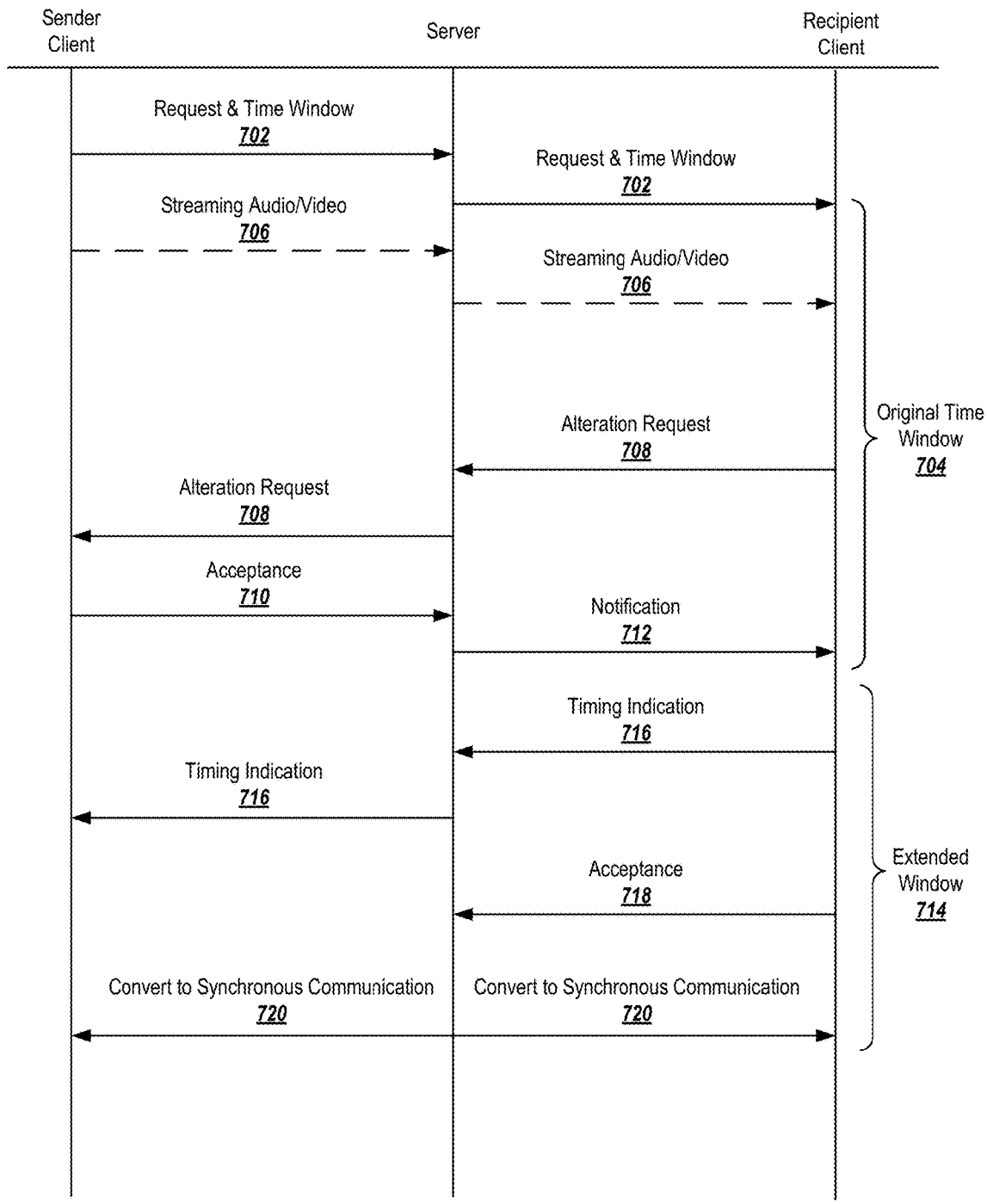
FIG. 7 is a data flow diagram depicting information exchange between various devices, according to an exemplary embodiment in which an answering window is provided.

FIG. 7 is a data flow graph depicting exemplary exchanges of data between the above-mentioned caller client device, callee client device, and a server device.

The sender client may transmit a call request 702 along with an answering window during which the request 702 remains valid. The request 702 may be transmitted to a server, which may forward the request to a recipient client. The answering window may result in an original time window 704, during which the recipient client can accept the call.

Optionally, the sender client may send streaming audio and/or video 706 to the server during the time window 704, for sharing with the recipient client.

The recipient client may send an alteration request 708 during the pendency of the original time window 704, requesting that the original time window be extended. The alteration request may be forwarded to the sender client. If the sender client approves the alteration request, an acceptance 710 may be transmitted to the server. The server may update its own records regarding the answering window, and may transmit a notification 712 that the window has been extended to the recipient client. This may result in an extended time window 714.

The recipient client may transmit a timing notification 716 to the server and/or sender client, indicating a time at which the recipient client expects to accept the call. Eventually, the sender client may transmit an acceptance 718. Upon receipt of the acceptance 718, the server may inform the sender client and may transmit conversion messages 720 converting the interaction to a synchronous video communication.

It is contemplated that the status monitoring logic and the answering window logic may be deployed separately or together. For example, a caller may transmit a call request with an answering window and, in the event that the callee rejects the call (or fails to respond) in the answering window, the callee's status may be monitored. In another embodiment, status monitoring may be employed without an answering window, while in still further embodiments an answering window may be employed without monitoring.

Messaging System Overview

Figure 8B:
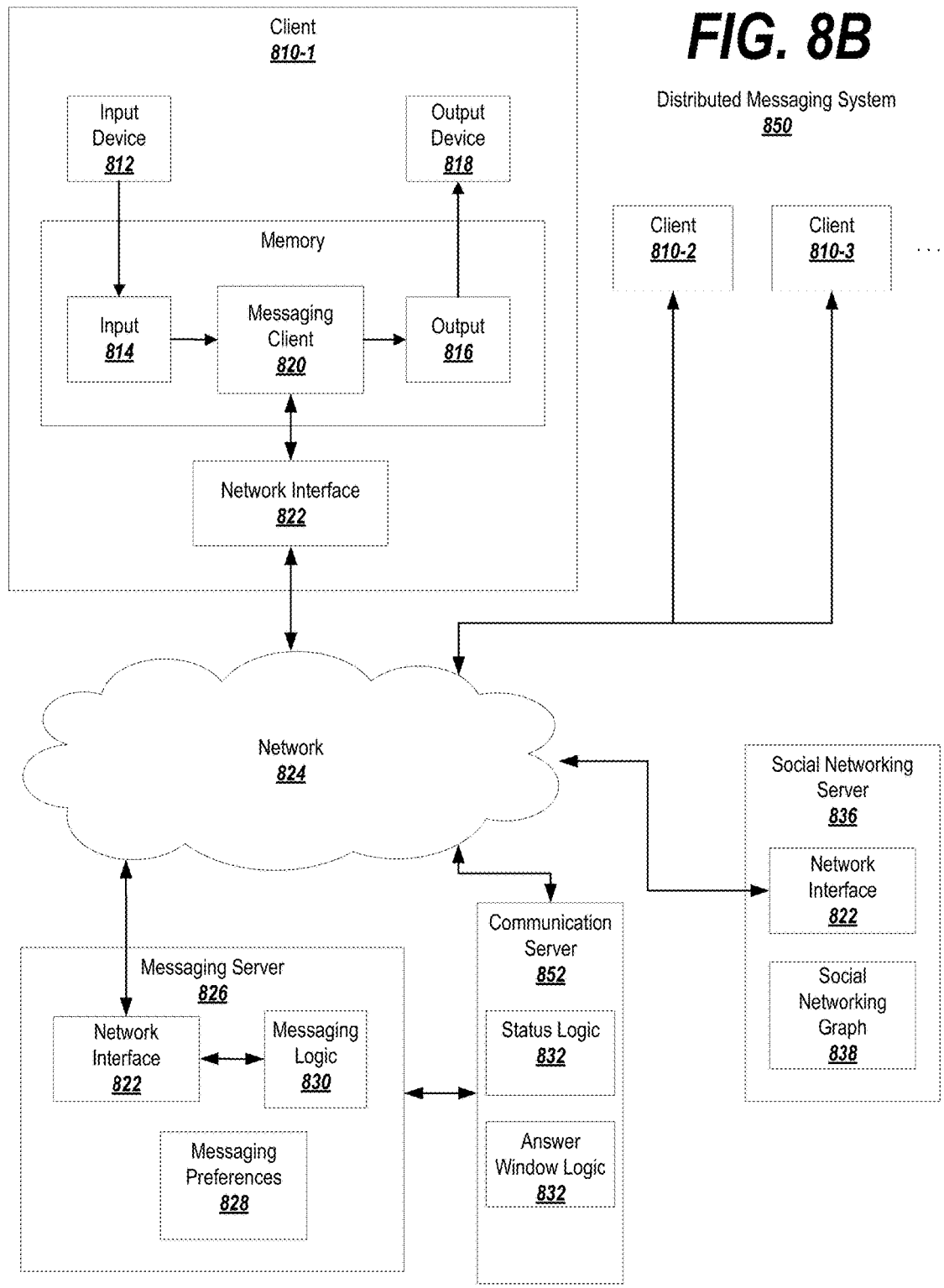
FIG. 8B is a block diagram providing an overview of a system including an exemplary distributed communications service.
Figure 8C:
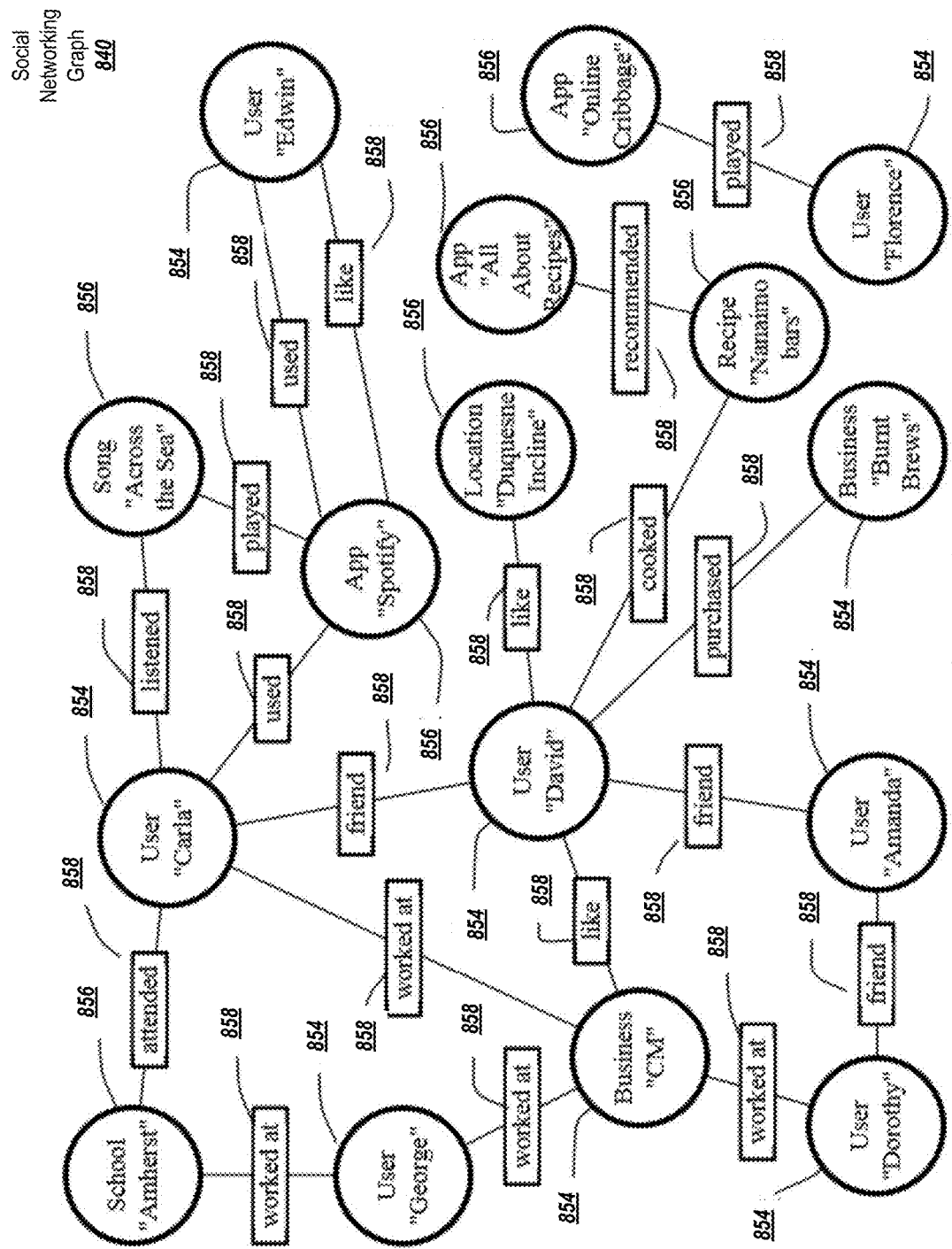
FIG. 8C depicts the social networking graph of FIGS. 8A-8B in more detail.

These examples may be implemented by a messaging system that is provided either locally, at a client device, or remotely (e.g., at a remote server). FIGS. 8A-8C depict various examples of messaging systems, and are discussed in more detail below.

FIG. 8A depicts an exemplary centralized messaging system 800, in which functionality for organizing messages asynchronously and/or using threads is integrated into a messaging server. The centralized system 800 may implement some or all of the structure and/or operations of a messaging service in a single computing entity, such as entirely within a single centralized server device 826.

The messaging system 800 may include a computer-implemented system having software applications that include one or more components. Although the messaging system 800 shown in FIG. 8A has a limited number of elements in a certain topology, the messaging system 800 may include more or fewer elements in alternate topologies.

A messaging service 800 may be generally arranged to receive, store, and deliver messages. The messaging service 800 may store messages while messaging clients 820, such as may execute on client devices 810, are offline and deliver the messages once the messaging clients are available.

A client device 810 may transmit messages addressed to a recipient user, user account, or other identifier resolving to a receiving client device 810. In exemplary embodiments, each of the client devices 810 and their respective messaging clients 820 are associated with a particular user or users of the messaging service 800. In some embodiments, the client devices 810 may be cellular devices such as smartphones and may be identified to the messaging service 800 based on a phone number associated with each of the client devices 810. In some embodiments, each messaging client may be associated with a user account registered with the messaging service 800. In general, each messaging client may be addressed through various techniques for the reception of messages. While in some embodiments the client devices 810 may be cellular devices, in other embodiments one or more of the client devices 810 may be personal computers, tablet devices, any other form of computing device.

The client 810 may include one or more input devices 812 and one or more output devices 818. The input devices 812 may include, for example, microphones, keyboards, cameras, electronic pens, touch screens, and other devices for receiving inputs including message data, requests, commands, user interface interactions, selections, and other types of input. The output devices 818 may include a speaker, a display device such as a monitor or touch screen, and other devices for presenting an interface to the messaging system 800.

The client 810 may include a memory, which may be a non-transitory computer readable storage medium, such as one or a combination of a hard drive, solid state drive, flash storage, read only memory, or random access memory. The memory may a representation of an input 814 and/or a representation of an output 816, as well as one or more applications. For example, the memory may store a messaging client 820 and/or a social networking client that allows a user to interact with a social networking service.

The input 814 may be textual, such as in the case where the input device 812 is a keyboard. Alternatively, the input 814 may be an audio recording, such as in the case where the input device 812 is a microphone. Accordingly, the input 814 may be subjected to automatic speech recognition (ASR) logic in order to transform the audio recording to text that is processable by the messaging system 800. The ASR logic may be located at the client device 810 (so that the audio recording is processed locally by the client 810 and corresponding text is transmitted to the messaging server 826), or may be located remotely at the messaging server 826 (in which case, the audio recording may be transmitted to the messaging server 826 and the messaging server 826 may process the audio into text). Other combinations are also possible—for example, if the input device 812 is a touch pad or electronic pen, the input 814 may be in the form of handwriting, which may be subjected to handwriting or optical character recognition analysis logic in order to transform the input 812 into processable text.

The client 810 may be provided with a network interface 822 for communicating with a network 824, such as the Internet. The network interface 822 may transmit the input 812 in a format and/or using a protocol compatible with the network 824 and may receive a corresponding output 816 from the network 824.

The network interface 822 may communicate through the network 824 to a messaging server 826. The messaging server 826 may be operative to receive, store, and forward messages between messaging clients.

The messaging server 826 may include a network interface 822, messaging preferences 828, and messaging inbox logic 830. The messaging preferences 828 may include one or more privacy settings for one or more users and/or message threads. For example, the messaging preferences 828 may include a setting that indicates whether to display messages synchronously or asynchronously. Furthermore, the messaging preferences 828 may include one or more settings, including default settings, for the logic described herein.

The messaging logic 830 may include status logic 832 for coordinating the monitoring and reporting the status of the caller and/or callee(s), as described above. The messaging logic may further include answer window logic 834 for setting up and maintaining an answering window, as further described above.

The network interface 822 of the client 810 and/or the messaging server 826 may also be used to communicate through the network 824 with a social networking server 836. The social networking server 836 may include or may interact with a social networking graph 838 that defines connections in a social network. Furthermore, the messaging server 826 may connect to the social networking server 836 for various purposes, such as retrieving connection information, messaging history, event details, etc. from the social network.

A user of the client 810 may be an individual (human user), an entity (e.g., an enterprise, business, or third-party application), or a group (e.g., of individuals or entities) that interacts or communicates with or over the social networking server 836. The social-networking server 836 may be a network-addressable computing system hosting an online social network. The social networking server 836 may generate, store, receive, and send social-networking data, such as, for example, user-profile data, concept-profile data, social-graph information, or other suitable data related to the online social network. The social networking server 836 may be accessed by the other components of the network environment either directly or via the network 824.

The social networking server 836 may include an authorization server (or other suitable component(s)) that allows users to opt in to or opt out of having their actions logged by social-networking server 836 or shared with other systems (e.g., third-party systems, such as the messaging server 826), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 836 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 838. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 836 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 836 may send a request to the data store for the object. The request may identify the user associated with the request. The requested data object may only be sent to the user (or a client system 810 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 836 or explicit connections of a user to a node, object, entity, brand, or page on social networking server 836. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 8A may be well-suited to deployment as a new system or as an upgrade to an existing system, because the video note logic is incorporated into the messaging server 826. In contrast, FIG. 8B depicts an exemplary distributed messaging system 850, in which functionality for processing video notes and upgrading asynchronous conversations to synchronous conversations is distributed and remotely accessible from the messaging server. Examples of a distributed system 850 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 8B are identical to those in FIG. 8A, and a description of these elements is not repeated here for the sake of brevity. The primary difference between the centralized embodiment and the distributed embodiment is the addition of a separate communication server 852, which hosts the status logic 832 and the answer window logic 834. The communication server 852 may be distinct from the messaging server 826 but may communicate with the messaging server 826, either directly or through the network 824, to provide the functionality of the video note logic 832 to the messaging server 826.

The embodiment depicted in FIG. 8B may be particularly well suited to allow exemplary embodiments to be deployed alongside existing messaging systems, for example when it is difficult or undesirable to replace an existing messaging server. Additionally, in some cases the messaging server 826 may have limited resources (e.g. processing or memory resources) that limit or preclude the addition of the additional pivot functionality. In such situations, the capabilities described herein may still be provided through the separate pivot server 882.

FIG. 8C illustrates an example of a social networking graph 838. In exemplary embodiments, a social networking service may store one or more social graphs 838 in one or more data stores as a social graph data structure via the social networking service.

The social graph 838 may include multiple nodes, such as user nodes 854 and concept nodes 856. The social graph 838 may furthermore include edges 858 connecting the nodes. The nodes and edges of social graph 838 may be stored as data objects, for example, in a data store (such as a social-graph database). Such a data store may include one or more searchable or queryable indexes of nodes or edges of social graph 838.

The social graph 838 may be accessed by a social-networking server 826, client system 810, third-party system, or any other approved system or device for suitable applications.

A user node 854 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 854 corresponding to the user, and store the user node 854 in one or more data stores. Users and user nodes 854 described herein may, where appropriate, refer to registered users and user nodes 854 associated with registered users. In addition or as an alternative, users and user nodes 854 described herein may, where appropriate, refer to users that have not registered with the social-networking system. In particular embodiments, a user node 854 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 854 may be associated with one or more data objects corresponding to information associated with a user. In particular embodiments, a user node 854 may correspond to one or more webpages. A user node 854 may be associated with a unique user identifier for the user in the social-networking system.

In particular embodiments, a concept node 856 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 856 may be associated with one or more data objects corresponding to information associated with concept node 856. In particular embodiments, a concept node 856 may correspond to one or more webpages.

In particular embodiments, a node in social graph 838 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 856. Profile pages may be viewable by all or a selected subset of other users. As an example and not by way of limitation, a user node 854 may have a corresponding user-profile page in which the corresponding user may add content, make declarations, or otherwise express himself or herself. A business page may comprise a user-profile page for a commerce entity. As another example and not by way of limitation, a concept node 856 may have a corresponding concept-profile page in which one or more users may add content, make declarations, or express themselves, particularly in relation to the concept corresponding to concept node 856.

In particular embodiments, a concept node 856 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 854 corresponding to the user and a concept node 856 corresponding to the third-party webpage or resource and store edge 858 in one or more data stores.

In particular embodiments, a pair of nodes in social graph 838 may be connected to each other by one or more edges 858. An edge 858 connecting a pair of nodes may represent a relationship between the pair of nodes. In particular embodiments, an edge 858 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 858 connecting the first user's user node 854 to the second user's user node 854 in social graph 838 and store edge 858 as social-graph information in one or more data stores. In the example of FIG. 8C, social graph 838 includes an edge 858 indicating a friend relation between user nodes 854 of user "Amanda" and user "Dorothy." Although this disclosure describes or illustrates particular edges 858 with particular attributes connecting particular user nodes 854, this disclosure contemplates any suitable edges 858 with any suitable attributes connecting user nodes 854. As an example and not by way of limitation, an edge 858 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 838 by one or more edges 858.

In particular embodiments, an edge 858 between a user node 854 and a concept node 856 may represent a particular action or activity performed by a user associated with user node 854 toward a concept associated with a concept node 856. As an example and not by way of limitation, as illustrated in FIG. 8C, a user may "like," "attended," "played," "listened," "cooked," "worked at," or "watched" a concept, each of which may correspond to an edge type or subtype. A concept-profile page corresponding to a concept node 856 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 858 and a "used" edge (as illustrated in FIG. 8C) between user nodes 854 corresponding to the user and concept nodes 856 corresponding to the song and application to indicate that the user listened to the song and used the application. Moreover, the social-networking system may create a "played" edge 858 (as illustrated in FIG. 8C) between concept nodes 856 corresponding to the song and the application to indicate that the particular song was played by the particular application. In this case, "played" edge 858 corresponds to an action performed by an external application (SPOTIFY) on an external audio file (the song "Across the Sea"). Although this disclosure describes particular edges 858 with particular attributes connecting user nodes 854 and concept nodes 856, this disclosure contemplates any suitable edges 858 with any suitable attributes connecting user nodes 854 and concept nodes 856. Moreover, although this disclosure describes edges between a user node 854 and a concept node 856 representing a single relationship, this disclosure contemplates edges between a user node 854 and a concept node 856 representing one or more relationships. As an example and not by way of limitation, an edge 858 may represent both that a user likes and has used at a particular concept. Alternatively, another edge 858 may represent each type of relationship (or multiples of a single relationship) between a user node 854 and a concept node 856 (as illustrated in FIG. 8C between user node 854 for user "Edwin" and concept node 856 for "SPOTIFY").

In particular embodiments, the social-networking system may create an edge 858 between a user node 854 and a concept node 856 in social graph 838. As an example and not by way of limitation, a user viewing a concept-profile page (such as, for example, by using a web browser or a special-purpose application hosted by the user's client system) may indicate that he or she likes the concept represented by the concept node 856 by clicking or selecting a "Like" icon, which may cause the user's client system to send to the social-networking system a message indicating the user's liking of the concept associated with the concept-profile page. In response to the message, the social-networking system may create an edge 858 between user node 854 associated with the user and concept node 856, as illustrated by "like" edge 858 between the user and concept node 856. In particular embodiments, the social-networking system may store an edge 858 in one or more data stores. In particular embodiments, an edge 858 may be automatically formed by the social-networking system in response to a particular user action. As an example and not by way of limitation, if a first user uploads a picture, watches a movie, or listens to a song, an edge 858 may be formed between user node 854 corresponding to the first user and concept nodes 856 corresponding to those concepts. Although this disclosure describes forming particular edges 858 in particular manners, this disclosure contemplates forming any suitable edges 858 in any suitable manner.

The social graph 838 may further comprise a plurality of product nodes. Product nodes may represent particular products that may be associated with a particular business. A business may provide a product catalog to a consumer-to-business service and the consumer-to-business service may therefore represent each of the products within the product in the social graph 838 with each product being in a distinct product node. A product node may comprise information relating to the product, such as pricing information, descriptive information, manufacturer information, availability information, and other relevant information. For example, each of the items on a menu for a restaurant may be represented within the social graph 838 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 838. The information for a product node may be manipulated by the social-networking system as a product object that encapsulates information regarding the referenced product.

As such, the social graph 838 may be used to infer shared interests, shared experiences, or other shared or common attributes of two or more users of a social-networking system. For instance, two or more users each having an edge to a common business, product, media item, institution, or other entity represented in the social graph 838 may indicate a shared relationship with that entity, which may be used to suggest customization of a use of a social-networking system, including a messaging system, for one or more users.

The embodiments described above may be performed by a messaging architecture, an example of which is next described with reference to FIG. 9.

Messaging Architecture

Figure 9:
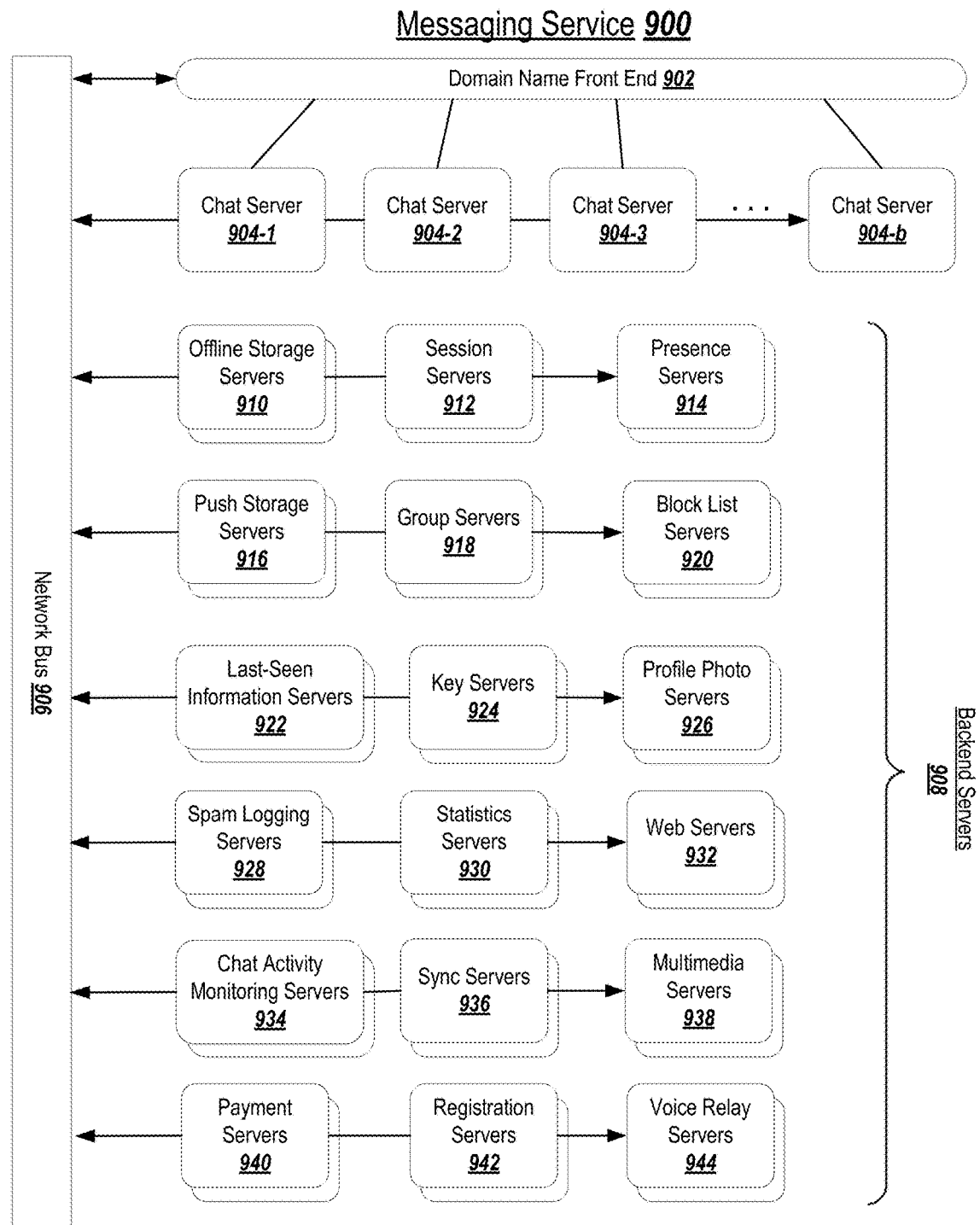
FIG. 9 is a block diagram depicting an example of a system for a messaging service.

FIG. 9 illustrates an embodiment of a plurality of servers implementing various functions of a messaging service 900. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-Internet-protocol (VoIP) voice communication between messaging clients for the performance of VoIP calls.

Figure 10:
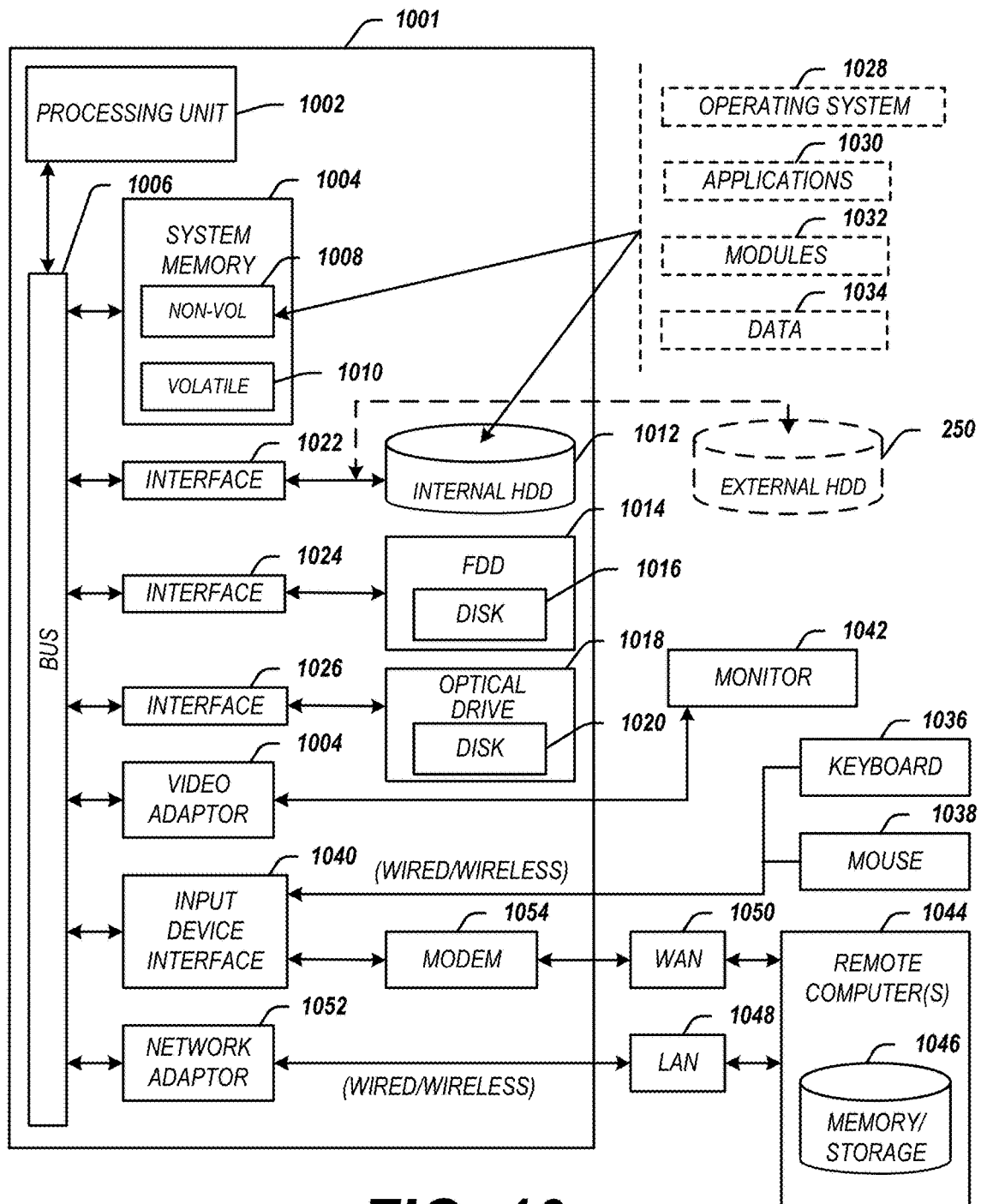
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
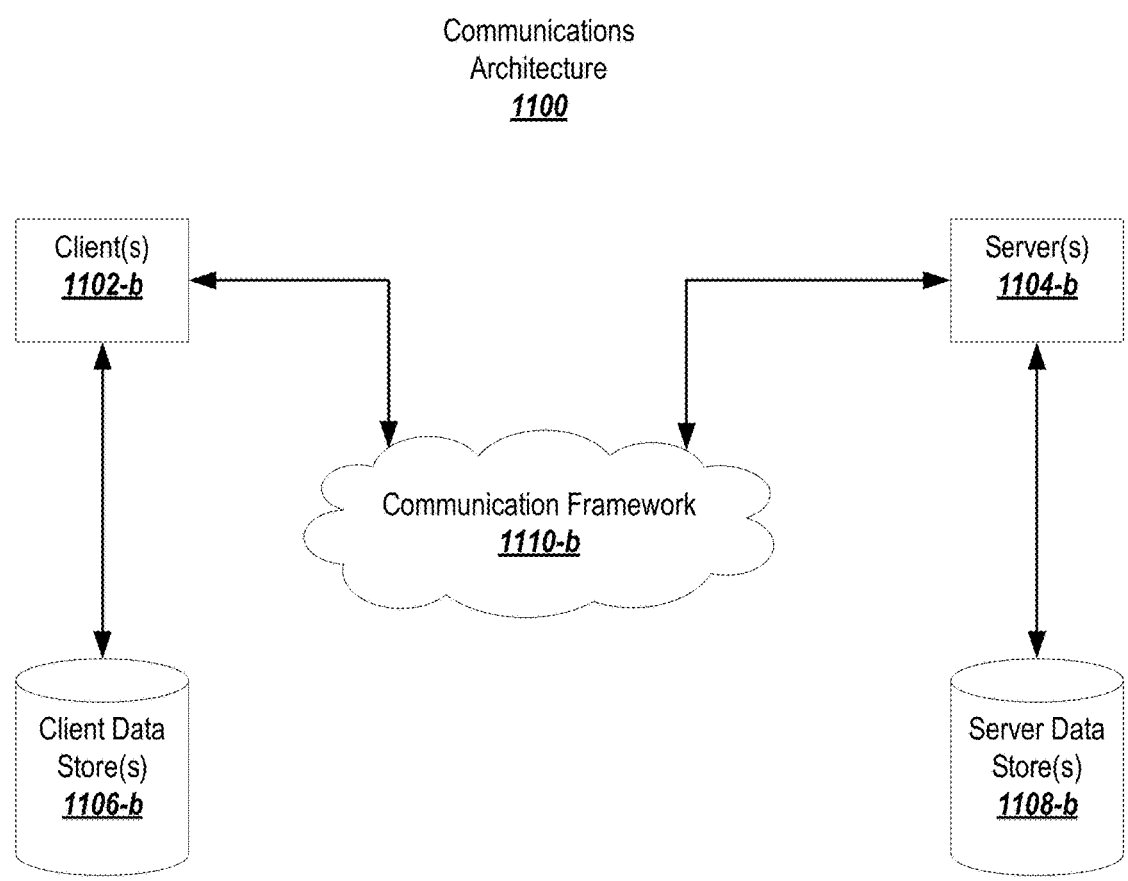
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
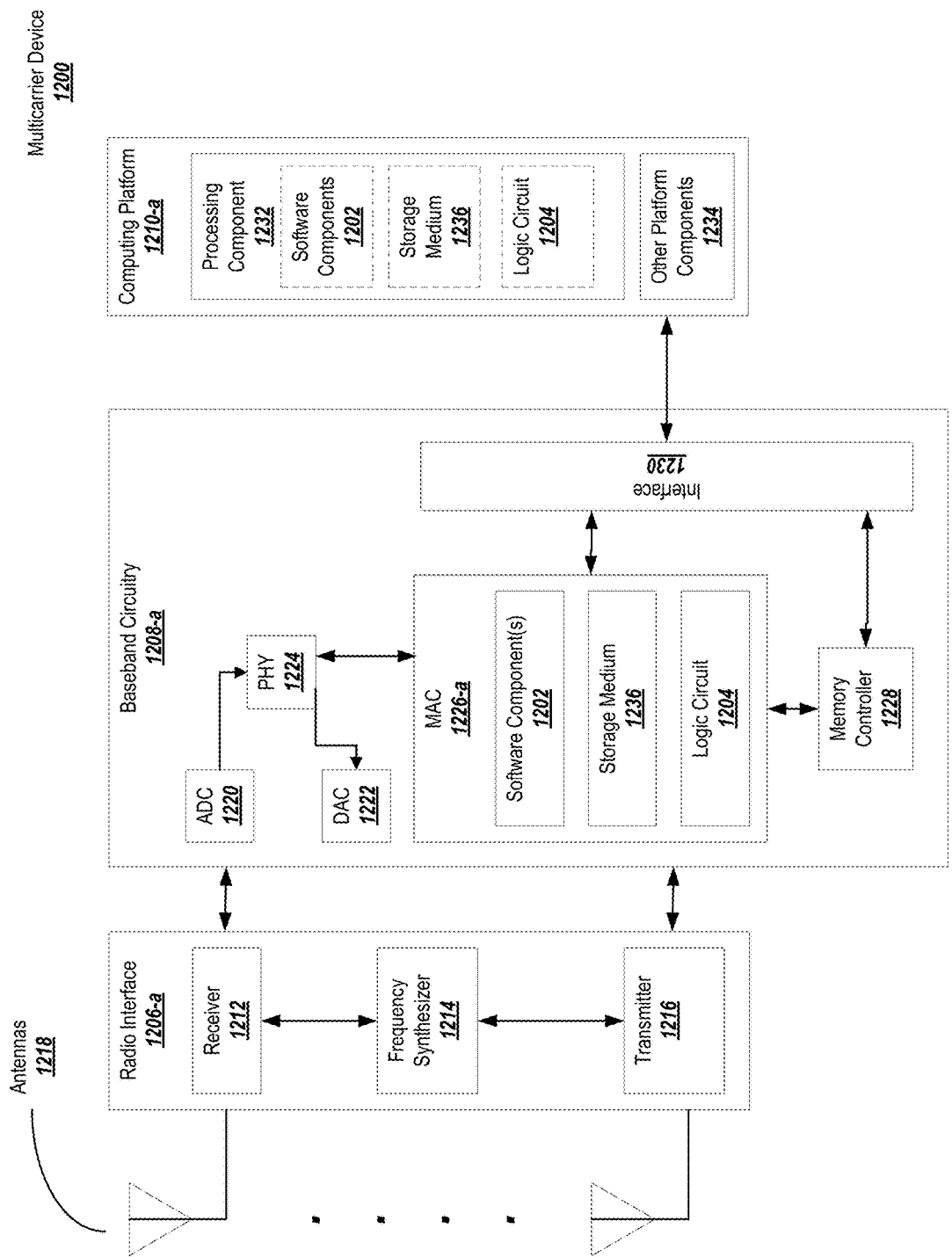
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled,"

however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
generating a request to engage in a video communication between a caller client device and a callee client device;
identifying a time window during which the caller remains available, the time window designated by the caller client device;
transmitting the request to engage in the video communication, the request remaining open during the time window and configured to allow the callee client device to accept the call at any time during the time window to transition directly into a synchronous video call;
collecting handshake information for connecting the caller client device with the callee client device while the call window remains open and before the request is accepted;
sharing at least one of audio or video from the caller client device to the callee client device during the time window;
receiving an acceptance of the request during the time window; and
connecting the caller client device and the callee client device in direct response to the acceptance while the time window remains open.

2. The method of claim 1, wherein the time window is: identified automatically based on scheduling information retrieved by the caller client device; or identified based on input received on a caller device interface.

3. The method of claim 1, further comprising placing the caller client device into a lobby, wherein the callee client device enters the lobby when accepting the request.

4. The method of claim 1, wherein connecting the caller client device and the callee client device comprises directly entering the video communication when the callee accepts the request.

5. The method of claim 1, further comprising:
receiving an alteration request from the callee client device to alter the time window;
receiving an indication of affirmation at the caller client device; and
altering the time window in accordance with the alteration request.

6. The method of claim 1, further comprising:
receiving a timing indication signaling the callee's intention to accept the request at a specified time.

7. A non-transitory computer-readable medium storing instructions configured to cause one or more processors to:
generate a request to engage in a video communication between a caller client device and a callee client device;
identify a time window during which the caller remains available, the time window designated by the caller client device;
transmit the request to engage in the video communication, the request remaining open during the time window and configured to allow the callee client device to accept the call at any time during the time window to transition directly into a synchronous video call;
collect handshake information for connecting the caller client device with the callee client device while the call window remains open and before the request is accepted;
share at least one of audio or video from the caller client device to the callee client device during the time window;
receive an acceptance of the request during the time window; and
connect the caller client device and the callee client device in direct response to the acceptance while the time window remains open.

8. The medium of claim 7, wherein the time window is: identified automatically based on scheduling information retrieved by the caller client device; or identified based on input received on a caller device interface.

9. The medium of claim 7, further storing instructions for placing the caller client device into a lobby, wherein the callee client device enters the lobby when accepting the request.

10. The medium of claim 7, wherein connecting the caller client device and the callee client device comprises directly entering the video communication when the callee accepts the request.

11. The medium of claim 7, further storing instructions for:
receiving an alteration request from the callee client device to alter the time window;
receiving an indication of affirmation at the caller client device; and altering the time window in accordance with the alteration request.

12. The medium of claim 8, further storing instructions for:
receiving a timing indication signaling the callee's intention to accept the request at a specified time.

13. An apparatus comprising:
a non-transitory computer readable medium configured to store instructions for facilitating a connection between two users in a call; and
a processor configured to execute the instructions, the instructions configured to cause the processor to:
generate a request to engage in a video communication between a caller client device and a callee client device;
identify a time window during which the caller remains available, the time window designated by the caller client device;
transmit the request to engage in the video communication, the request remaining open during the time window and configured to allow the callee client device to accept the call at any time during the time window to transition directly into a synchronous video call;
collect handshake information for connecting the caller client device with the callee client device while the call window remains open and before the request is accepted;
share at least one of audio or video from the caller client device to the callee client device during the time window;
receive an acceptance of the request during the time window; and
connect the caller client device and the callee client device in direct response to the acceptance while the time window remains open.

14. The apparatus of claim 13, wherein the time window is: identified automatically based on scheduling information retrieved by the caller client device; or identified based on input received on a caller device interface.

15. The apparatus of claim 13, the instructions further configured to cause the processors to place the caller client device into a lobby, wherein the callee client device enters the lobby when accepting the request, or for to directly enter the video communication when the callee accepts the request.

16. The apparatus of claim 13, the instructions further configured to cause the processors to:
receive an alteration request from the callee client device to alter the time window;
receive an indication of affirmation at the caller client device; and
alter the time window in accordance with the alteration request.

17. The apparatus of claim 13, the instructions further configured to cause the processors to receive a timing indication signaling the callee's intention to accept the request at a specified time.

18. The medium of claim 7, wherein the request was maintained open during the time window by:
receiving a request to initiate the video communication from the caller client device, the request to initiate the video communication comprising an indication of the time window;
maintaining the caller client device in a call lobby while awaiting an acceptance message from the callee client device;
receiving the acceptance from the callee client device while the time window remains open; and
initiating a synchronous video conversation between the caller client device and the callee client device in response to receiving the acceptance.

* * * * *